United States Patent
Kim

(10) Patent No.: US 10,924,529 B2
(45) Date of Patent: Feb. 16, 2021

(54) SYSTEM AND METHOD OF TRANSMITTING DATA BY USING WIDGET WINDOW

(71) Applicant: Samsung Electronics Co., Ltd., Suwon-si (KR)

(72) Inventor: Jae Hwan Kim, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 16/423,971

(22) Filed: May 28, 2019

(65) Prior Publication Data
US 2019/0281106 A1 Sep. 12, 2019

Related U.S. Application Data

(63) Continuation of application No. 13/768,676, filed on Feb. 15, 2013, now abandoned.

(30) Foreign Application Priority Data

Feb. 16, 2012 (KR) .................. 10-2012-0015892

(51) Int. Cl.
*H04L 29/08* (2006.01)
*H04W 4/21* (2018.01)
*G06F 3/0486* (2013.01)

(52) U.S. Cl.
CPC ............... *H04L 67/06* (2013.01); *H04W 4/21* (2018.02); *G06F 3/0486* (2013.01); *H04L 67/04* (2013.01)

(58) Field of Classification Search
CPC ........ H04L 67/06; H04L 67/04; G06F 3/0486
See application file for complete search history.

(56) References Cited

U.S. PATENT DOCUMENTS

| 6,760,412 B1 | 7/2004 | Loucks |
| 7,092,671 B2 | 8/2006 | Lunsford et al. |
| 7,203,505 B1 | 4/2007 | Larikka et al. |

(Continued)

FOREIGN PATENT DOCUMENTS

| JP | 2006-505991 A | 2/2006 |
| KR | 10-2004-0060636 A | 7/2004 |

(Continued)

OTHER PUBLICATIONS

G. Dorbes and C. Hue, "Beyond RCS: Capitalizing on address book to embrace multimedia services," 2009 13th International Conference on Intelligence in Next Generation Networks, Bordeaux, 2009, pp. 1-6, doi: 10.1109/ICIN.2009.5357094. (Year: 2009).*

(Continued)

*Primary Examiner* — James T Tsai
(74) *Attorney, Agent, or Firm* — Jefferson IP Law, LLP

(57) ABSTRACT

A system and method of transmitting data by using a widget window are provided. A method of transmitting, by a first device, a file by using a widget window includes selecting a file stored in the first device, and moving the file to the widget window, when the file is moved to the widget window, displaying a device selection list, and, when at least one device is selected from the device selection list, providing the file to the selected device, wherein the file is provided to the selected device via a second device that is connected with the first device.

24 Claims, 17 Drawing Sheets

(56) References Cited

U.S. PATENT DOCUMENTS

| | | |
|---|---|---|
| 7,249,156 B2 | 7/2007 | Chae |
| 7,783,985 B2 | 8/2010 | Indiran et al. |
| 7,876,885 B2 | 1/2011 | Riikonen et al. |
| 8,554,194 B2 | 10/2013 | Kim et al. |
| 8,638,309 B2 | 1/2014 | Lee et al. |
| 2006/0101490 A1 | 5/2006 | Leurs |
| 2007/0156846 A1 | 7/2007 | Seward |
| 2007/0157101 A1 | 7/2007 | Indiran et al. |
| 2008/0003981 A1 | 1/2008 | Sharma et al. |
| 2008/0022304 A1 | 1/2008 | Prus et al. |
| 2008/0102856 A1* | 5/2008 | Fortescue ............. H04W 4/023 455/456.1 |
| 2008/0143685 A1 | 6/2008 | Lee et al. |
| 2009/0011799 A1* | 1/2009 | Douthitt ............. H04M 1/2757 455/569.1 |
| 2009/0024609 A1* | 1/2009 | Barker ................. G06F 16/986 |
| 2009/0234967 A1 | 9/2009 | Yu et al. |
| 2010/0004010 A1 | 1/2010 | Shin et al. |
| 2010/0185736 A1 | 7/2010 | Jayaraman |
| 2010/0251177 A1 | 9/2010 | Geppert et al. |
| 2011/0078184 A1 | 3/2011 | Song et al. |
| 2011/0145932 A1 | 6/2011 | Nerger et al. |
| 2011/0222466 A1 | 9/2011 | Pance et al. |
| 2011/0286428 A1 | 11/2011 | Souissi |
| 2011/0288932 A1 | 11/2011 | Marks et al. |
| 2012/0005273 A1 | 1/2012 | Rathod et al. |
| 2012/0159472 A1 | 6/2012 | Hong et al. |
| 2012/0198353 A1 | 8/2012 | Lee et al. |
| 2013/0104118 A1 | 4/2013 | Somani et al. |
| 2014/0089119 A1 | 3/2014 | Fahn et al. |
| 2014/0114801 A1 | 4/2014 | Ann et al. |
| 2016/0070801 A1 | 3/2016 | Patil |

FOREIGN PATENT DOCUMENTS

| | | |
|---|---|---|
| KR | 10-2005-0104146 A | 11/2005 |
| KR | 10-2006-0007623 A | 1/2006 |
| KR | 10-2006-0038656 A | 5/2006 |
| KR | 10-2006-0113326 A | 11/2006 |
| KR | 10-2008-0054762 A | 6/2008 |
| KR | 10-0834622 B1 | 6/2008 |
| KR | 10-2008-0084319 A | 9/2008 |
| KR | 10-2009-0077166 A | 7/2009 |
| KR | 10-2010-0029265 A | 3/2010 |
| KR | 10-2011-0037247 A | 4/2011 |
| KR | 10-2011-0103515 A | 9/2011 |
| RU | 2 273 105 C2 | 3/2006 |
| WO | 2011/046823 A2 | 4/2011 |
| WO | 2011/160139 A1 | 12/2011 |

OTHER PUBLICATIONS

Korean Office Action dated Aug. 30, 2018; Korean Appln. No. 10-2012-0015892.

Laurence Cable, "How to sync your contacts with OS X Address Book" Jan. 10, 2011 <URL= http://www. tech radar. com/us/news/ software/ app l icatio ns/how-to-sync-you r-co ntacts-with-os-x-add ress-book-91 9680> last accessed, Oct. 30, 2014.

Martin Sauter, "Beyond 3G: Bringing Networks, Terminals and the Web Together" (2009).

Vietnamese Office Action dated Feb. 27, 2019, issued in Vietnamese Patent Application No. 1-2014-03077.

* cited by examiner

| SPEED-DIAL FIELD | USER FIELD | PHONE NUMBER FIELD | GROUP FIELD | DEVICE FIELD | APPLICATION FIELD |
|---|---|---|---|---|---|
| 1 | Tom | 555-1234 | Friend | Galaxy S2 | Twitter |
| 2 | John | 777-4321 | Business | I-Phone 4S | Facebook |
| ... | ... | ... | ... | ... | ... |

SYSTEM AND METHOD OF TRANSMITTING DATA BY USING WIDGET WINDOW

CROSS-REFERENCE TO RELATED PATENT APPLICATION

This application is a continuation application of prior application Ser. No. 13/768,676, filed on Feb. 15, 2013, which claimed priority under 35 U.S.C § 119(a) of a Korean patent application number 10-2012-0015892, filed on Feb. 16, 2012, in the Korean Intellectual Property Office, the disclosure of which is incorporated by reference herein in its entirety.

BACKGROUND OF THE INVENTION

1. Field of the Invention

The present invention relates to a system and method of transmitting data by using a widget window. More particularly, the present invention relates to a system and method of transmitting data to a device, which is selected by using a widget window, via another device.

2. Description of the Related Art

Recently, contents such as pictures, moving pictures, and the like that are generated by using smart phones have increased dramatically, and as the smart phones have improved functions and office applications that are widely used, there is an increasing need to share data of a Personal Computer (PC) with mobile phones. Also, various services are provided to share data between a PC and a mobile phone by using a PC client, a cloud service, a window searcher, or the like. However, since it is required to use a Universal Serial Bus (USB) cable or to apply an account to a mobile phone and then to configure complicated settings to connect a PC and the mobile phone, a troublesome procedure is required to be performed to share data. Thus, there is a demand for a technology to effectively detect a device by using an address book stored in a mobile phone and transmit data to the detected device via the mobile phone.

SUMMARY OF THE INVENTION

Aspects of present invention are to address at least the above-mentioned problems and/or disadvantages and to provide at least the advantages described below. Accordingly, an aspect of the present invention is to provide a system and method of effectively selecting a transmission target using a widget window and transmitting data to the selected device.

Another aspect of the present invention is to provide a system and method of detecting a transmission target using a widget window from an address book stored in a source device and providing data to the transmission target via the source device.

According to an aspect of the present invention, a method of transmitting, by a first device, a file by using a widget window is provided. The method includes selecting a file stored in the first device and moving the selected file to the widget window, when the selected file is moved to the widget window, displaying a device selection list, and, when at least one device is selected from the device selection list, providing the selected file to the selected device, wherein the selected file is provided to the device via a second device that is connected with the first device.

The device selection list may include a list to select the second device that is connected with the first device and a list to select a third device that is not connected with the first device.

When the second device is selected from the device selection list, the operation of providing the selected file may include an operation of providing the selected file to the selected second device.

When the third device is selected from the device selection list, the method may further include inputting a keyword to the widget window and detecting a device in an address book received from the second device wherein the device corresponds to the input keyword and providing the selected file may include an operation of providing the selected file to the detected device.

The keyword may include one of tag values, and the tag values may differ from each other according to types of applications installed in devices listed in the address book.

The first device and the second device may be connected to each other via Wireless Fidelity (Wi-Fi) communication, and the second device may transmit data received from the first device to the detected device via at least one of Third Generation (3G) mobile communication and Fourth Generation (4G) mobile communication.

The first device may include at least one of a Personal Computer (PC), a tablet PC, and a smart television (TV), and the second device may include a mobile communication terminal.

The operation of moving the selected file may be performed in a drag and drop manner.

In accordance with another aspect of the present invention, a first device of transmitting a file by using a widget window is provided. The first device includes a widget window generating unit for displaying a device selection list when a file stored in the first device is moved to the widget window on a screen of the first device, and a data transmitting unit for providing a file to a device selected from the device selection list, wherein the file is provided to the selected device via a second device that is connected with the first device.

The device selection list may include the second device that is connected with the first device and a third device that is not connected with the first device.

When the second device is selected from the device selection list, the data transmitting unit may provide the file to the selected second device.

The first device may further include a detecting unit for detecting a device corresponding to a keyword that is input to the widget window when the third device is selected from the device selection list, and the detecting unit may detect the device in an address book received from the second device, wherein the device corresponds to the keyword.

The data transmitting unit may provide the file to the detected device via the second device.

The keyword may include one of tag values, and the tag values may differ from each other according to types of applications that are installed in devices listed in the address book.

The first device and the second device may be connected to each other via Wireless Fidelity (Wi-Fi) communication and the second device may transmit data received from the first device to the detected device via at least one of Third Generation (3G) mobile communication and Fourth Generation (4G) mobile communication.

The first device may include at least one of a Personal Computer (PC), a tablet PC, and a smart TV and the second device may include a mobile communication terminal.

The file may be moved to the widget window in a drag and drop manner.

According to another aspect of the present invention, a computer-readable recording medium having recorded thereon a program for executing the method, by using a computer, is provided.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

The same reference numerals are used to represent the same elements throughout the drawings.

DETAILED DESCRIPTION OF THE INVENTION

Figure 1:
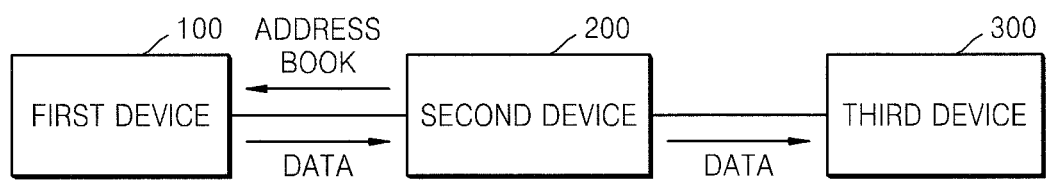
FIG. 1 is a diagram of a device detection system for data transmission according to an exemplary embodiment of the present invention.

The following description with reference to the accompanying drawings is provided to assist in a comprehensive understanding of exemplary embodiments of the invention as defined by the claims and their equivalents. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness. The invention may, however, be embodied in many different forms and should not be construed as being limited to the exemplary embodiments of the present invention set forth herein. Although reference is made to the exemplary embodiments depicted in the drawings and the following descriptions, the embodiments disclosed herein are not meant to be exhaustive of the various alternative designs and embodiments that are encompassed by the disclosure.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Throughout the specification, it will also be understood that when an element is referred to as being "connected to" another element, it can be directly connected to the other element, or it can be electrically connected to the other element by having intervening elements disposed therebetween. Also, when a part "includes" or "comprises" an element, unless there is a particular description contrary thereto, the part can further include other elements, not excluding the other elements.

Expressions such as "at least one of," when preceding a list of elements, modify the entire list of elements and do not modify the individual elements of the list.

FIG. 1 is a diagram of a device detection system for data transmission according to an exemplary embodiment of the present invention.

Referring to FIG. 1, a device detection system includes a first device 100, a second device 200, and a third device 300. The first device 100 may include at least one of a Personal Computer (PC), a tablet PC, and a smart television (TV), and the second device 200 and the third device 300 may include mobile communication terminals, but types of the first through third devices 100, 200, and 300 are not limited thereto.

In the device detection system, the first device 100 may detect the third device 300 to transmit and receive data using an address book stored in the second device 200. In this case, the first device 100 may separately generate and display a widget window for device detection and data transmission. When the widget window is selected by a user, the first device 100 may provide the user with a service for the device detection. The widget window may be an execution window of an application that connects the first device 100 and the second device 200. Throughout the specification, the term "device detection" refers to detection of at least one of a user list and a device list that are included in an address book, i.e., detection of at least one of a telephone number of a device, a user name of a device, an e-mail address of a device user, and a Social Network Service (SNS) account of a device user, which are included in the address book.

In addition, the first device 100 may exchange data with the third device 300 by using a wireless communication function of the second device 200. When the second device 200 receives a text message from the third device 300, the first device 100 may also receive the text message from the second device 200 and may display the text message, and then the user may check the text message via the first device 100 and may provide an answer message to the third device 300 via the second device 200.

In another example, when the second device 200 receives a call request from the third device 300, the second device 200 may provide the caller information of the third device 300 to the first device 100. In this case, the user may check the caller information via the first device 100 and may decide whether or not to receive the call request. The user may check the caller information of the third device 300 via the first device 100, may write a message related to call reception, and may provide the message to the third device 300 via the second device 200.

In yet another example, the first device 100 may provide a file stored in the first device 100 to the second device 200 via a widget window. The first device 100 may also receive content that is being executed in the second device 200 and output the received content on its associated display.

The first device 100 will be described in more detail with reference to FIG. 2.

Figure 2:
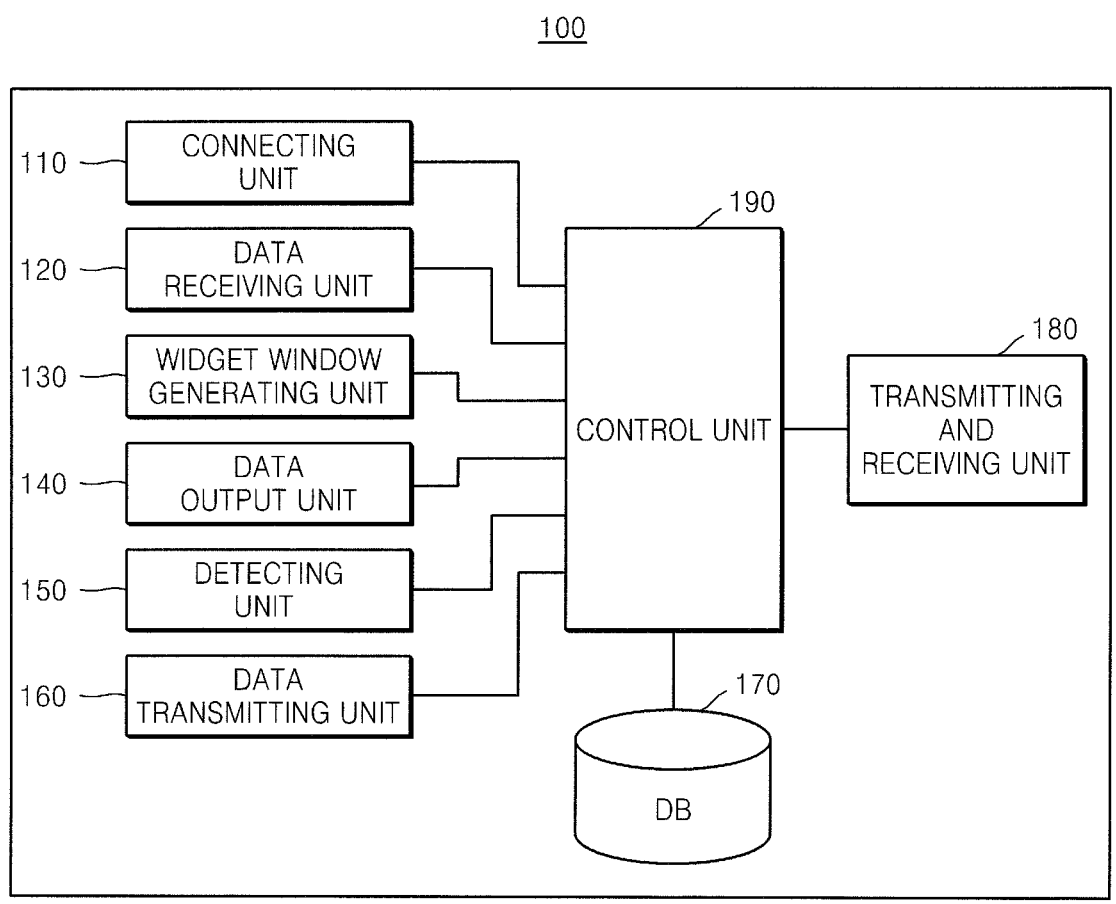
FIG. 2 is a diagram illustrating a structure of a first device according to an exemplary embodiment of the present invention.

FIG. 2 is a diagram illustrating the structure of the first device 100, according to an exemplary embodiment of the present invention.

Referring to FIG. 2, the first device 100 includes a connecting unit 110, a data receiving unit 120, a widget window generating unit 130, a data output unit 140, a detecting unit 150, a data transmitting unit 160, a DataBase (DB) 170, a transmitting and receiving unit 180, and a control unit 190.

The connecting unit 110 connects the first device 100 and the second device 200. In one example, the connecting unit 110 may connect the first device 100 and the second device 200 via a user input in a widget window that is generated by the widget window generating unit 130 described below. For example, when a user selects a tethering button of the widget window, the connecting unit 110 may request the second device 200 for the connection. Although a user input is not separately input, if the widget window is executed, the connecting unit 110 may request the second device 200 for the connection.

The connecting unit 110 may store the previously received access information from the second device 200, which is for connection to the second device 200. The connecting unit 110 may first request connection to the second device 200 and then may receive the access information from the second device 200. The access information for connection between the first device 100 and the second device 200 may be previously set in the first device 100 and the second device 200 by a user.

The data receiving unit 120 receives data from the second device 200. For example, the data receiving unit 120 may receive an address book that is stored in the second device 200 and may be used by the first device 100 to detect a device to receive data using a widget window. In another example, the data receiving unit 120 may receive information from the second device 200 associated with installed applications in the devices and may also include the address book. Alternatively, information associated with applications installed in the devices may be stored in the address book.

The data receiving unit 120 may also receive caller information of the third device 300 from the second device 200. When the third device 300 requests a phone call, the data receiving unit 120 may receive the caller information of the third device 300 from the second device 200, which may be displayed on a screen via the widget window.

In yet another example, the data receiving unit 120 may receive a text message via the second device 200. When the second device 200 receives the text message from the third device 300, the data receiving unit 120 may receive the text message and device information of the third device 300 from the second device 200. The device information may include at least one of a phone number, a user identification value, and an identification value of an application installed in the device.

Also, the data receiving unit 120 may receive content that is being executed in the second device 200. For example, the data receiving unit 120 may receive the content that is being executed in the second device 200, in a streaming manner. In another example, when a screen is captured in the second device 200, the data receiving unit 120 may receive the captured screen of the second device 200.

The widget window generating unit 130 generates a widget window for a data exchange with the second device 200. The widget window may include a detection field for device detection that may be displayed on a pre-set area of a background screen of the first device 100. A guide message for the device detection may also be displayed in the detection field of the widget window. For example, when a keyword is input via the detection field of the widget window, a device associated with the input keyword may be detected.

When a file stored in the first device 100 is moved to the widget window, the widget window generating unit 130 generates a file transmission method selection window that is used to select of a file transmission target. The file transmission method selection window may include a list for selecting the target device, such as the second device 200 or the third device 300 that is not connected to the first device 100. For example, the file transmission method selection window may include a selection list such as 'transmission to second device', 'detection of another device', or the like. Also, when the third device 300 is selected (i.e., when 'detection of another device' is selected), a guide message related to a keyword input may be displayed in the detection field of the widget window.

The data output unit 140 outputs data received from the second device 200 on the first device 100. For example, when the detection field of the widget window is selected in response to a user input, the data output unit 140 may display the address book received from the second device 200 on a screen of the first device 100.

When the data output unit 140 receives the caller information from the second device 200, the data output unit 140 may display the received caller information on the screen of the first device 100. The data output unit 140 may display a message regarding an incoming call on the screen of the first device 100. In more detail, the data output unit 140 may extract a user name and a phone number of the third device 300 from the caller information of the third device 300, combine an extracted value with a predefined text, and output a guide message regarding whether or not to accept the incoming call on the first device 100. For example, the data output unit 140 may display a guide message saying "An incoming call from Tom (555-1234). Do you want to accept this call?" on the screen of the first device 100. When the user rejects to accept the incoming call, the data output unit 140 may display a message transmission window for transmission of a predetermined text message on the screen.

The data output unit 140 may output a text message that is received via the second device 200 on the screen of the first device 100. When the first device 100 receives a message from the third device 300 via the second device 200, the data output unit 140 generates a communication window for a message exchange between the first device 100 and the third device 300 and displays the communication window on the screen.

The data output unit 140 may output the content that is being executed in the second device 200 on the first device 100. The data output unit 140 may determine an application to execute based on content that is received from the second device 200 and may output the content that is being executed in the second device 200 using the determined application. For example, when the first device 100 and the second device 200 are connected to each other while a moving picture is reproduced in the second device 200, the data output unit 140 may output content that is streamed from the second device 200 in real-time to the first device 100. In this case, application information to execute the received content may be previously set and stored in the first device 100.

The detecting unit 150 may detect a device to receive data based on a user input via the widget window. When a user selects the widget window and inputs a keyword to the detection field of the widget window, the detecting unit 150 may detect a device that corresponds to the input keyword from the address book received from the second device 200.

In this example, the keyword input by the user may include a pre-set tag value and the detecting unit 150 may filter devices included in the address book according to the tag value. The tag value may differ from another tag value according to types of data transmission services that are supported by the devices included in the address book. For example, the tag value may be a prefix value, and in this regard, a prefix 'A' may be used to detect devices in which Twitter® is installed, and a prefix 'B' may be used to detect devices in which Facebook® is installed. Thus, when 'A Tom' is input to the widget window, the detecting unit 150 may detect a device whose user name is 'Tom' from among the devices in which Twitter® is installed. In another example, when 'B friends' is input to the widget window, the detecting unit 150 may detect a device of a user who is a friend of a user of the first device 100 from among the devices in which Facebook® is installed.

The data transmitting unit 160 transmits data to the third device 300 via the second device 200. The data transmitting unit 160 may provide the data to the second device 200 and may transmit the data to the third device 300 by using a communication function of the second device 200.

In more detail, the data transmitting unit 160 may provide a text message to the third device 300 via the second device 200. When the third device 300 is detected and selected in the first device 100 via the widget window, the communication window for a message exchange between the first device 100 and the third device 300 may be generated in the first device 100. For example, when a text message is input to the communication window by a user, the first device 100 may transmit the text message to the third device 300 via the second device 200.

In addition, the data transmitting unit 160 may transmit information associated with acceptance of an incoming call. For example, when the third device 300 requests a phone call to the second device 200, the second device 200 may provide the caller information to the first device 100. In this case, the first device 100 may provide information related to acceptance of an incoming call to the third device 300 via the second device 200. For example, when a user rejects the incoming call, the first device 100 may provide the third device 300 with a message related to the rejection of the incoming call. For example, an input window message may be displayed on the first device 100 and the user may input a message saying "I'm in a meeting so I can't receive your call" into the input window.

The data transmitting unit 160 may also transmit a file stored in the first device 100 to the third device 300 via the second device 200. For example, the user may select the file stored in the first device 100, may move the selected file to the widget window, may detect the third device 300 via the widget window, and may transmit the selected file to the third device 300 via the second device 200.

The DB 170 stores information required for the first device 100 to detect the third device 300 by using the address book stored in the second device 200 and also stores information required to exchange data with the second device 200 and the third device 300. For example, the DB 170 may store information about the address book that is received from the second device 200 and information about types of applications corresponding to different tag values.

The transmitting and receiving unit 180 exchanges data with the second device 200 and the third device 300. The transmitting and receiving unit 180 may exchange data with the third device 300 via the second device 200.

In order to allow the first device 100 to detect the third device 300 and exchange data with the second device 200 and the third device 300, the control unit 190 controls the connecting unit 110, the data receiving unit 120, the widget window generating unit 130, the data output unit 140, the detecting unit 150, the data transmitting unit 160, the DB 170, and the transmitting and receiving unit 180.

Hereinafter, the second device 200 will be described with reference to FIG. 3.

Figure 3:
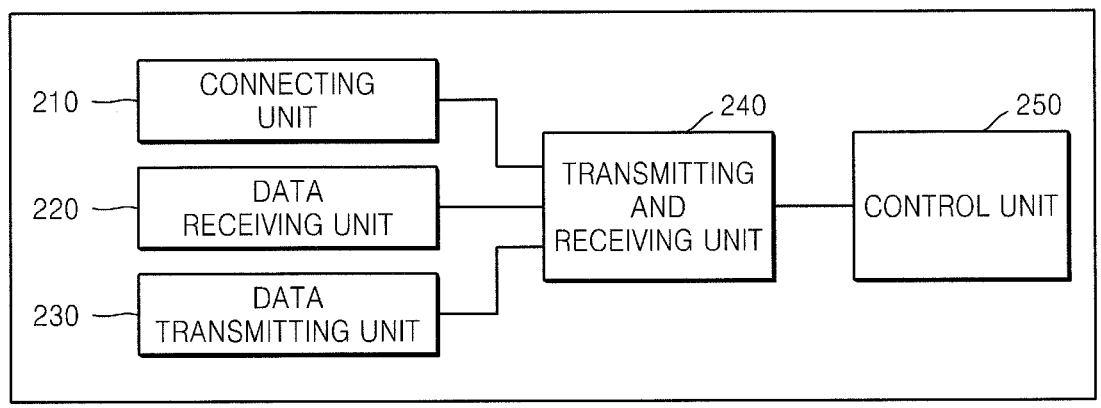
FIG. 3 is a diagram illustrating a structure of a second device according to an exemplary embodiment of the present invention.

FIG. 3 illustrates an example a structure of the second device 200 according to an exemplary embodiment of the present invention.

Referring to FIG. 3, the second device 200 includes a connecting unit 210, a data receiving unit 220, a data transmitting unit 230, a transmitting and receiving unit 240, and a control unit 250.

The connecting unit 210 connects the second device 200 and the first device 100 based on a user input via the widget window of the first device 100. For example, when a user selects a tethering button included in the widget window of the first device 100, the connecting unit 210 may receive a connection request from the first device 100.

The connecting unit 210 may provide the first device 100 with access information for connection to the first device 100. The access information may be previously received from the first device 100 and may store the access information. In another example, the connecting unit 210 may first receive a connection request from the first device 100 and, in response, provide the access information to the first device 100. In yet another example, the access information may be previously set in the first device 100 and the second device 200 by a user.

The data receiving unit 220 receives data to be provided to the third device 300 from the first device 100. The data receiving unit 220 may receive a text message input to the first device 100. In this example, the data receiving unit 220 may also receive information associated with the third device 300 from the first device 100. For example, the data receiving unit 220 may receive an identification value of the third device 300, a phone number of the third device 300, and/or a user name of the third device 300 from the first device 100.

The data receiving unit 220 may also receive information that corresponds to acceptance of an incoming call from the third device 300. For instance, the data receiving unit 220 may receive a call-connection command or a phone call rejection signal from the first device 100. The data receiving unit 220 may also receive a message regarding the rejection of the incoming call from the first device 100. For example, the data receiving unit 220 may receive a message saying "I'm in a meeting so I can't receive your call."

Also, the data receiving unit 220 may receive a file from the first device 100. The data receiving unit 220 may receive a file, which is selected and moved to the widget window in the first device 100.

The data transmitting unit 230 also provides the first device 100 with an address book stored in the second device 200. The address book that is provided to the first device 100 may be used in the first device 100 to detect a device to receive data using the widget window. The data transmitting unit 230 may also provide the first device 100 with information about applications installed in devices, the information including the address book. Alternatively, information about applications installed in devices may be included in the address book.

The data transmitting unit 230 provides the first device 100 with content that is being executed in the second device 200 in a streaming manner. In another example, when a predetermined screen is captured in the second device 200, the data transmitting unit 230 may provide the first device 100 with the captured screen of the second device 200.

The data transmitting unit 230 may also provide the third device 300 with data that is received from the first device 100. For example, the data transmitting unit 230 may provide the third device 300 with a text message that is received from the first device 100. In another example, the data transmitting unit 230 may provide the first device 100 with a text message that is received from the third device 300.

The data transmitting unit 230 may provide the third device 300 with a file that is received from the first device 100.

The transmitting and receiving unit 240 exchanges information with the first device 100 and the third device 300 so that the first device 100 may detect a device by using an address book of the second device 200 and may provide data to the detected device via the second device 200.

The control unit 250 controls all operations of the second device 200. That is, the control unit 250 controls the connecting unit 210, the data receiving unit 220, the data transmitting unit 230, and the transmitting and receiving unit 240 so that the second device 200 may provide the address book to the first device 100 and data may be exchanged between the first device 100 and the third device 300.

Hereinafter, a method of transmitting data between devices will be described with reference to FIG. 4.

Figure 4:
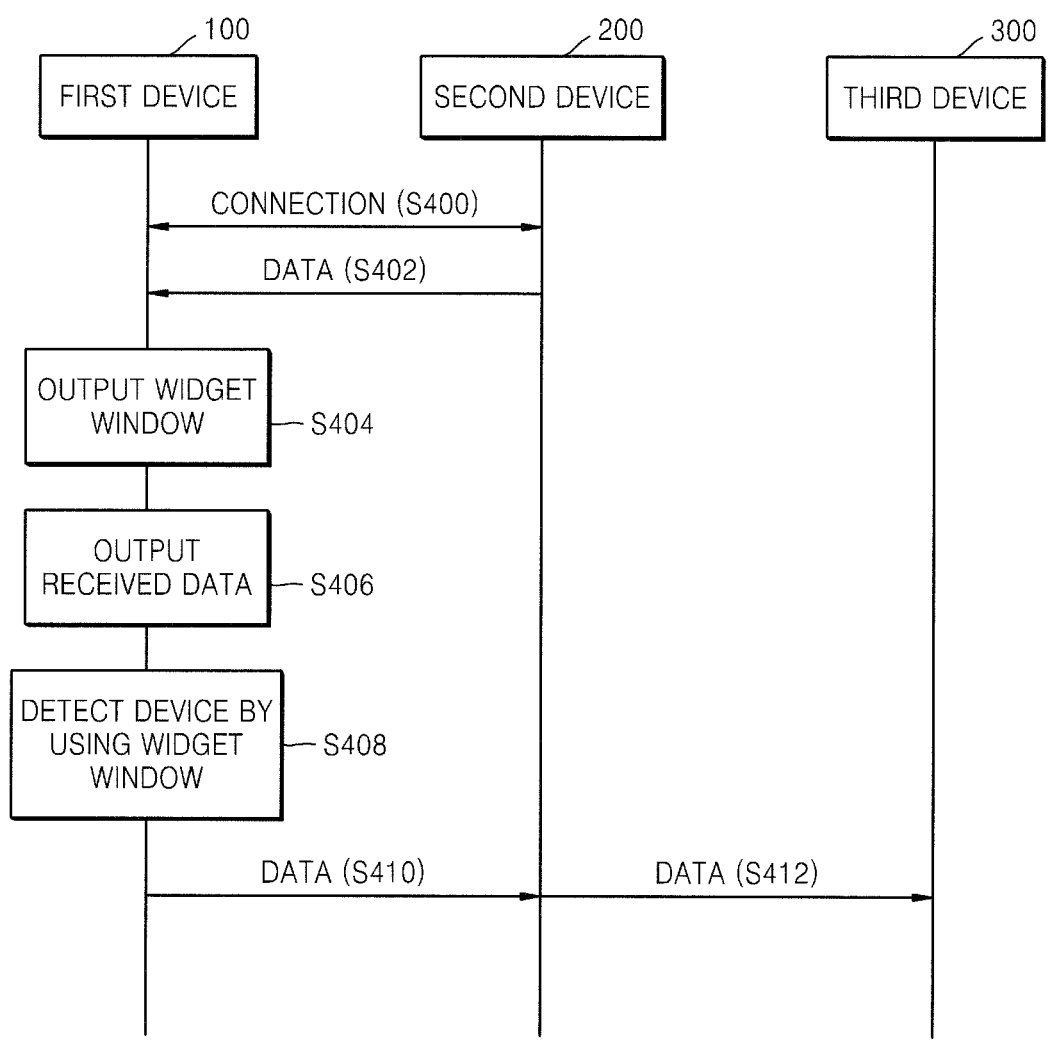
FIG. 4 is a flowchart of a method of transmitting data between devices according to an exemplary embodiment of the present invention.

FIG. 4 is a flowchart of a method of transmitting data between devices according to an exemplary embodiment of the present invention.

In operation S400, the first device 100 and the second device 200 are connected to each other. In operation S400, the first device 100 and the second device 200 may be connected to each other based on a user input via a widget window of the first device 100. For example, when a user selects a tethering button of the widget window, the first device 100 may request connection to the second device 200. In another example, if the widget window is executed, the first device 100 may request the connection to the second device 200. Also, when a screen is captured in the second device 200, the first device 100 may receive the captured screen from the second device 200.

At operation S400, the first device 100 may first request a connection to the second device 200 and then may receive the access information from the second device 200. Also, the access information for connection between the first device 100 and the second device 200 may be stored or previously set in the first device 100 and the second device 200 by a user.

At operation S402, the first device 100 receives data from the second device 200. For example, the first device 100 may receive an address book that is stored in the second device 200 and may be used by the first device 100 to detect another device to receive data by using the widget window. The first device 100 may also receive information related to applications that are installed in the devices in the address book. Alternatively, information related to applications installed in the devices may be stored in the address book.

In operation S402, the first device 100 may receive caller information of the third device 300 from the second device 200. When the third device 300 requests a phone call to the second device 200, the data receiving unit 120 receives the caller information of the third device 300 from the second device 200 and the received caller information may be displayed on a screen of the first device 100 via the widget window.

Also, in operation S402, the first device 100 may receive a text message from the third device 300 via the second device 200. When the second device 200 receives the text message from the third device 300, the first device 100 may receive the text message and device information of the third device 300 from the second device 200. The device information may include a phone number, a user identification value, and/or an identification value of an application installed in a device.

Also, in operation S402, the first device 100 may receive content that is being executed in the second device 200. The first device 100 may receive the content that is being executed in the second device 200, for example, in a streaming manner.

In operation S404, the first device 100 outputs the widget window on its screen for a data exchange with the second device 200. The widget window may include a detection field for device detection and may be displayed on a predefined area of a background screen of the first device 100. A guide message may be displayed in the detection field of the widget window for the device detection. Referring to FIG. 4, the widget window is output after operation S402, but may be output before operation S400 or operation S402 to initiate file transfer, for example.

In operation S406, the first device 100 outputs the data that is received from the second device 200. When the detection field of the widget window is selected in response to a user input, the first device 100 may display an address book that is received from the second device 200 on the screen of the first device 100.

When the first device 100 receives the caller information of the third device 300 from the second device 200, the first device 100 may display the received caller information on the screen. In more detail, the first device 100 may extract a user name and a phone number of the third device 300 from the caller information of the third device 300, may combine the extracted information with a predefined text, and then may output a guide message requesting acceptance of the incoming call. For example, the first device 100 may display a guide message stating "An incoming call from Tom (555-1234). Do you want to receive this call?" When the user rejects the incoming call, the first device 100 may display a message transmission window on the screen to transmit a predetermined text message to the third device 300.

In operation S406, the first device 100 may output a text message that is received by the second device 200 on its screen. When the first device 100 receives a message of the third device 300 via the second device 200, the first device 100 may generate a communication window for a message exchange between the first device 100 and the third device 300 and may display the communication window on its screen.

The first device 100 may output the content that is being executed in the second device 200. The first device 100 may determine an application to execute the content received from the second device 200 and may output the content that is being executed in the second device 200 using the determined application. For example, when the first device 100 and the second device 200 are connected to each other while a moving picture is reproduced in the second device 200, the first device 100 may output content that is streamed from the second device 200 in real-time to the first device 100. In this example, application information to execute the received content may be previously set and stored in the first device 100.

In operation S408, the first device 100 detects a device to receive data using the widget window based on a user input. When a user selects the widget window and inputs a predetermined keyword into the detection field of the widget window, the first device 100 may detect a device that corresponds to the input keyword in the address book. When a file stored in the first device 100 is moved to the widget window, a message for guiding a keyword with respect to detection of a device to receive the file may be displayed in the widget window.

In this case, the keyword that is input by the user may include a predefined tag value and the first device 100 may filter devices in the address book according to the tag value. The tag value may correspond to data transmission services that are supported by the devices in the address book. For example, the tag value may be a prefix value corresponding to a specific service or function. For example, a prefix 'A' may be used to detect devices having Twitter® is installed and a prefix 'B' may be used to detect devices having Facebook® is installed. Thus, when 'A Tom' is input to the widget window, the first device 100 may detect a device whose user name is 'Tom' from among the devices in which Twitter® is installed. When 'B friends' is input to the widget window, the first device 100 may detect a device of a user who is a friend of a user of the first device 100 from among the devices in which Facebook® is installed.

In operation S410, the first device 100 provides the second device 200 with data that will be provided to the third device 300, such as a text message that is input to the first device 100, for example. When the third device 300 is detected and selected in the first device 100 via the widget window, the communication window for a message exchange between the first device 100 and the third device 300 may be generated to allow a user to input a text message and may transmit the text message to the third device 300 via the second device 200.

At operation S410, the first device 100 may transmit information related to acceptance of an incoming call. For example, when the third device 300 requests a phone call to the second device 200, the second device 200 may provide the caller information to the first device 100. In this case, the first device 100 may provide information related to acceptance of an incoming call to the second device 200. For example, when a user rejects the incoming call from the third device 300, the first device 100 may provide the second device 200 with a message related to the rejection of the incoming call. For example, an input window for an input of a call-connection message may be displayed on the first device 100 and then the user may input a message stating "I'm in a meeting so I can't receive your call" into the input window.

In another example of operation S410, the first device 100 may transmit a file stored in the first device 100 to the second device 200. When a user selects a file stored in the first device 100, the selected file may be provided to the second device 200. For example, the user may select the file stored in the first device 100 by placing the file in the widget window, may detect the third device 300 via the widget window, and may provide the second device 200 with an identification value of the third device 300 and the selected file.

In operation S412, the second device 200 provides the third device 300 with the data received from the first device 100. For example, the second device 200 may provide the third device 300 a text message received from the first device 100, information about a call-connection, and/or a file. In this case, the second device 200 may receive device information related to the third device 300 (e.g., a phone number, an e-mail address, or the like) from the first device 100 and may transmit the data to the third device 300 based on the received device information.

Hereinafter, a method of detecting a device to receive data will be described with reference to FIG. 5.

Figure 5:
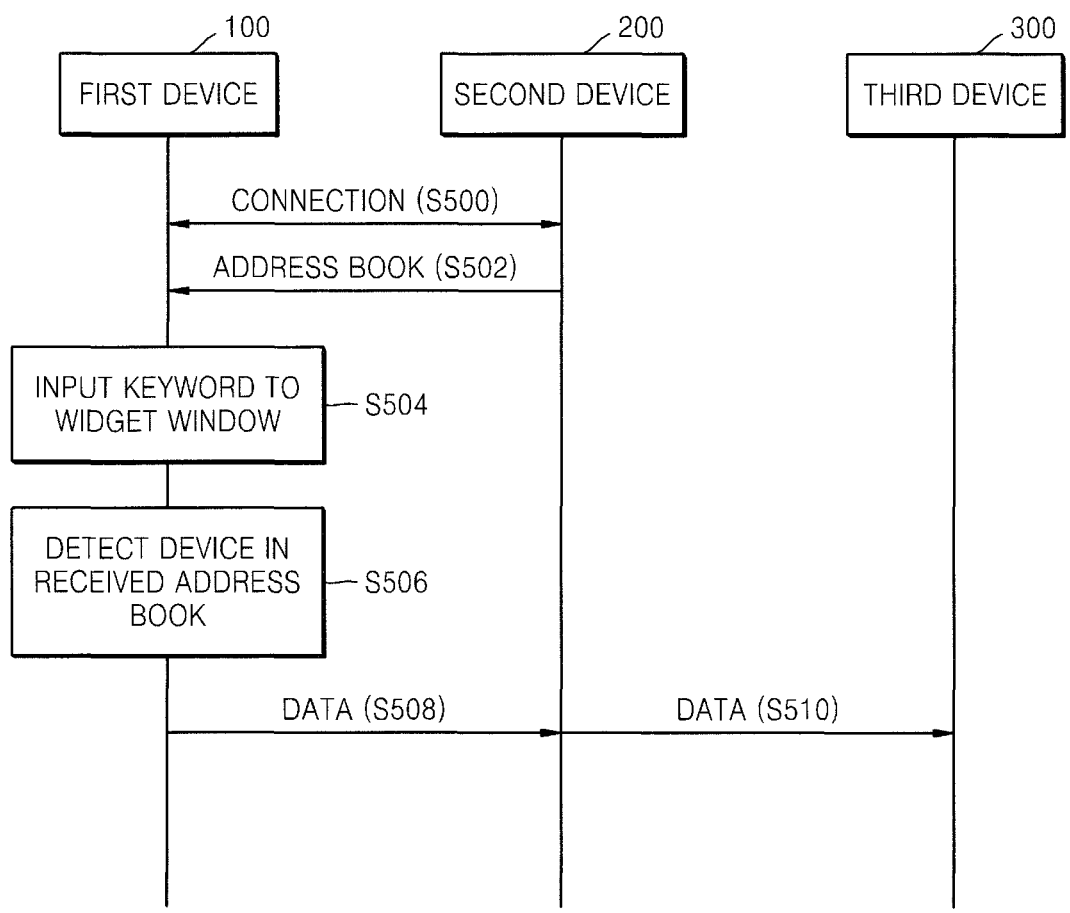
FIG. 5 is a flowchart of a method of detecting a device to receive data according to an exemplary embodiment of the present invention.

FIG. 5 is a flowchart of a method of detecting a device to receive data, according to an exemplary embodiment of the present invention.

In operation S500, the first device 100 and the second device 200 may be connected to each other based on, for example, a user input via a widget window of the first device 100. For example, when a user selects a tethering button of the widget window, the first device 100 may request connection to the second device 200 to further connect to the third device 300.

In operation S502, the first device 100 receives an address book from the second device 200. The address book received from the second device 200 may include at least one of a telephone number of a device, a user name of a device, an e-mail address of a device user, and an SNS account of a device user. The address book may be used by the first device 100 to detect a device to receive data using the widget window. Also, the first device 100 may receive information related to applications installed in the devices in the address book. Alternatively, information related to applications installed in the devices may be stored in the address book.

In operation S504, the first device 100 receives a keyword input for device detection via the widget window, which may include a detection field for device detection and may be displayed on a predefined area of a background screen of the first device 100. A guide message for the device detection may also be displayed in the detection field of the widget window. The guide message may be displayed when a file is selected and then is moved to the widget window.

In operation S504, the first device 100 may also receive a keyword that is input by a user via the widget window. The keyword may include a user name of a device or a phone number of a device. In another example, the keyword may include a tag value associated with a service or a function. For example, the tag value may be a prefix value and detection targets may differ from each other according to the tag value. For example, a tag value '@' may be used in detection through group names, and a tag value '#' may be used in detection through phone numbers. In such an example, devices in the address book may be filtered according to the tag value. For example, a tag value '$' may be used to filter recent reception and transmission contact addresses of the list, a tag value 'A' may be used to filter devices in which Twitter® is installed, and a tag value 'B' may be used to filter devices in which Facebook® is installed.

In addition, the widget window may be used to search for contents and messages that are stored in the first device 100 and the second device 200. In this case, a tag value '!' may be used to search for a music file, a tag value '!!' may be used to search for a moving picture file, and a tag value '&' may be used to search for a message.

The widget window may be used to detect a peripheral device connected to the first device 100. For example, a tag value '^' may be used to detect the peripheral device by using Digital Living Network Alliance (DLNA).

In operation S506, the first device 100 may detect the devices related to the input keyword in the address book. In this case, the first device 100 may filter devices in which Twitter® is installed, and a prefix 'B' may be used to detect devices in which Facebook® is installed. Thus, when 'A Tom' is input to the widget window, the first device 100 may filter the devices in which Twitter® is installed and then may detect a device whose user name is 'Tom' from among the filtered devices. Also, when 'B friends' is input to the widget window, the first device 100 may filter the devices in which Facebook® is installed and then may detect a device of a user who is a friend of the user of the first device 100 from among the filtered devices.

In operation S508, the first device 100 may provide the second device 200 with the data to be provided to the detected third device 300. For example, the first device 100 may provide the second device 200 with a text message input by the user or a file selected by the user. The first device 100 may also provide the second device 200 with device information of the third device 300 to receive the data including a user name, a phone number, and/or an e-mail address of a user, for example.

In operation S510, the second device 200 transmits the data received from the first device 100 to the third device 300 using the device information of the third device 300.

Hereinafter, a method of transmitting data between devices by using a widget window will be described with reference to FIG. 6.

Figure 6:
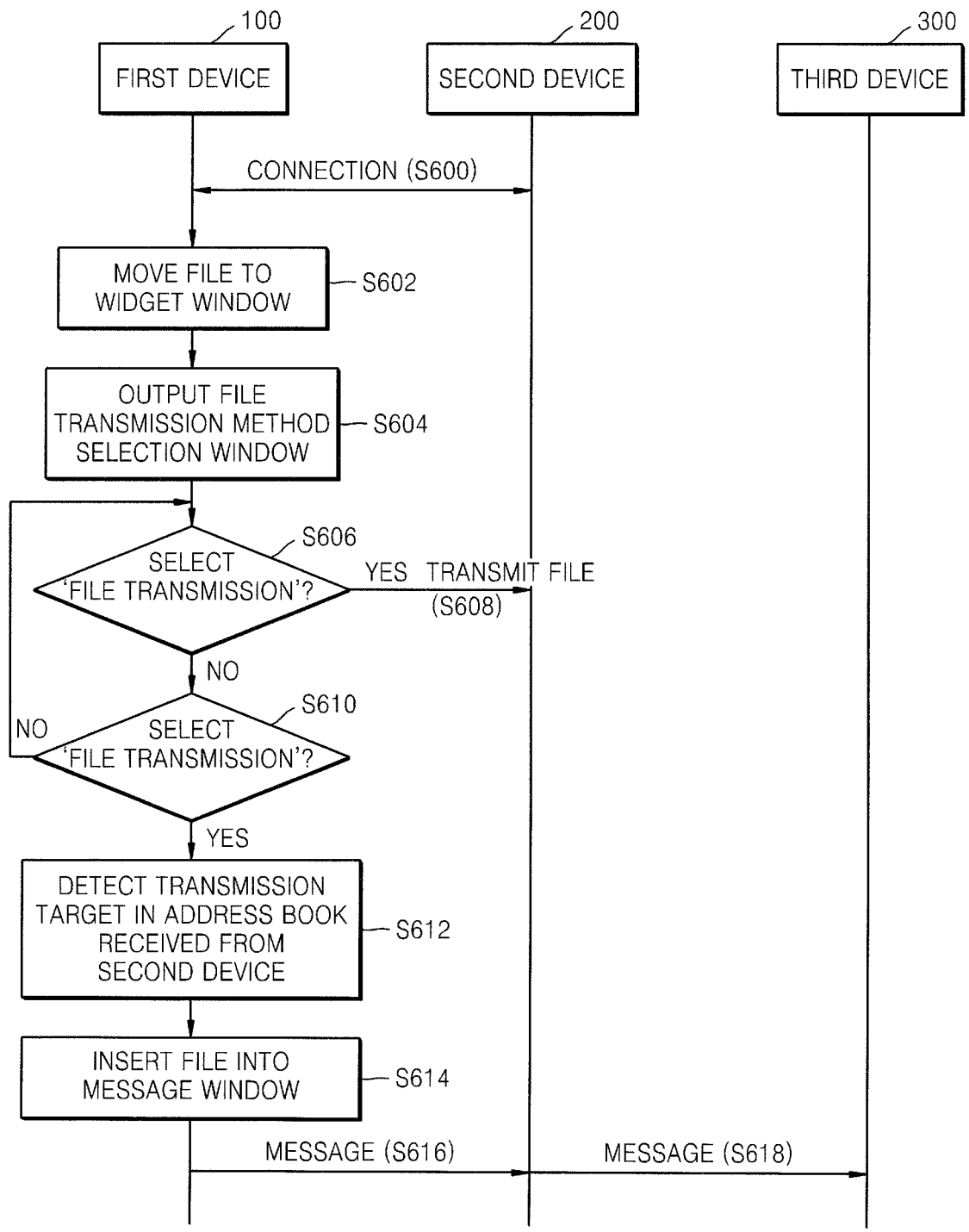
FIG. 6 is a flowchart of a method of transmitting data between devices by using a widget window according to an exemplary embodiment of the present invention.

FIG. 6 is a flowchart of a method of transmitting data between devices by using a widget window, according to an exemplary embodiment of the present invention.

In operation S600, the first device 100 and the second device 200 may be connected to each other based on a user input via a widget window. For example, when a user selects a tethering button of the widget window, the first device 100 may request connection to the second device 200. In other examples, the second device 200 may request connection to the first device 100.

In operation S602, in response to the user input, the first device 100 may move a file that is selected to the widget window. For example, the user may select a file stored in the first device 100 and move the selected file to the widget window in a drag and drop manner.

In operation S604, the first device 100 may display a file transmission method selection window on the screen to allow a user to select a file transmission method. The file transmission method selection window includes a list containing 'file transmission' for direct file transmission and 'message transmission' for file transmission via a message window.

In operation S606, the first device 100 determines whether 'file transmission' is selected in the file transmission method selection window. If 'file transmission' is selected according to a user input at operation S606, the first device 100 directly transmits a file to the second device 200 in operation S608.

Also, in operation S606, if 'file transmission' is not selected, in operation S610, the first device 100 determines whether 'message transmission' is selected in the file transmission method selection window.

In operation S610, if 'message transmission' is selected, in operation S612, the first device 100 detects a transmission target. In operation S612, the first device 100 may receive a keyword to detect the transmission target by using a keyword input by the user.

In this case, the keyword may include a user name of a device, a phone number of the device, or a tag value. For example, the tag value may be a prefix value corresponding to data transmission services that are supported by devices included in the address book. The first device 100 may filter the device by using the tag value included in the keyword. For example, a prefix 'A' may be used to detect devices in which Twitter® is installed, and a prefix 'B' may be used to detect devices in which Facebook® is installed. Thus, when 'A Tom' is input to the widget window, the first device 100 may filter the devices in which Twitter® is installed and then may detect a device whose user name is 'Tom' from the filtered devices. When 'B friends' is input to the widget window, the first device 100 may filter the devices in which Facebook® is installed and then may detect a device of a user who is a friend of the user of the first device 100 from the filtered devices. The first device 100 selects at least one of the detected devices as a transmission target in the address book that is received from the second device 200.

In operation S614, the first device 100 may generate the message transmission window with respect to the device detected in operation S612 and may insert the file into the generated message transmission window.

However, whether or not to display the file transmission method selection window on the first device 100 may be decided according to a state of the second device 200. For example, when the message transmission window is displayed on the second device 200, the first device 100 may not display the file transmission method selection window.

Display of the file transmission method selection window on the first device 100 may be decided according to a state of the first device 100. For example, when a message transmission window is displayed on the first device 100, the first device 100 may not display the file transmission method selection window. Also, the first device 100 may insert the selected file into the message transmission window displayed on the first device 100.

In operations S616 and S618, the first device 100 provides the selected file to the third device 300 via the second device 200. In such an example, the third device 300 may be the device that is selected in operation S612.

Hereinafter, a method of transmitting data between devices by using a widget window will be described with reference to FIG. 7.

Figure 7:
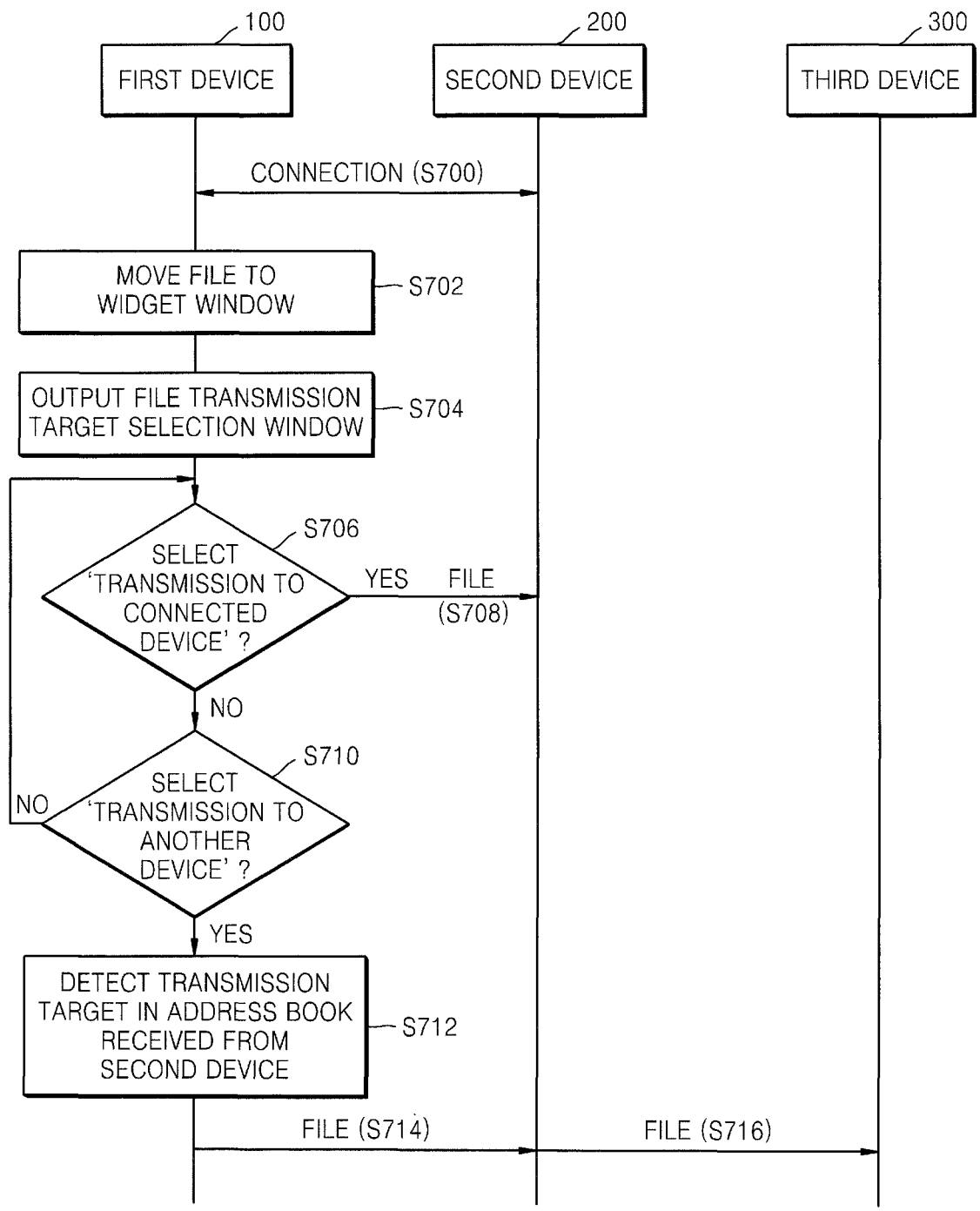
FIG. 7 is a flowchart of a method of transmitting data between devices by using a widget window according to another exemplary embodiment of the present invention.

FIG. 7 is a flowchart of a method of transmitting data between devices by using a widget window, according to another exemplary embodiment of the present invention.

In operation S700, the first device 100 and the second device 200 may be connected to each other based on a user input via a widget window of the first device 100. For example, when a user selects a tethering button of the widget window, the first device 100 may request connection to the second device 200. In other examples, the second device 200 may request connection to the first device 100.

In operation S702, the first device 100 may move a file to the widget window that is selected in response to the user input. The user may select a file stored in the first device 100 and may move the selected file to the widget window in a drag and drop manner.

In operation S704, the first device 100 outputs a selection list to select a target to receive the selected file. In operation S704, the first device 100 may display a file transmission target selection window on the screen that includes a list containing 'transmission to connected device' for file transmission to the second device 200 and 'transmission to another device' for file transmission to a device that is not connected to the first device 100.

In operation S706, the first device 100 determines whether 'transmission to connected device' is selected in the file transmission target selection window. In operation S706, when 'transmission to connected device' is selected according to a user input, the first device 100 directly transmits the selected file to the second device 200 in operation S708.

Returning to operation S706, when 'transmission to connected device' is not selected, the first device 100 determines whether 'transmission to another device' is selected in the file transmission target selection window in operation S710.

In operation S710, when 'transmission to another device' is selected, the first device 100 detects a device to receive a file at operation S712. In operation S712, the first device 100 may receive a keyword to be used in detecting and selecting the device to receive a file.

In operations S714 and S716, the first device 100 provides the selected file to the third device 300 via the second device 200. In this example, the third device 300 may be the device that is detected in operation S712.

Hereinafter, a method of receiving and processing caller information of the third device 300, performed by the first device 100, will be described with reference to FIG. 8.

Figure 8:
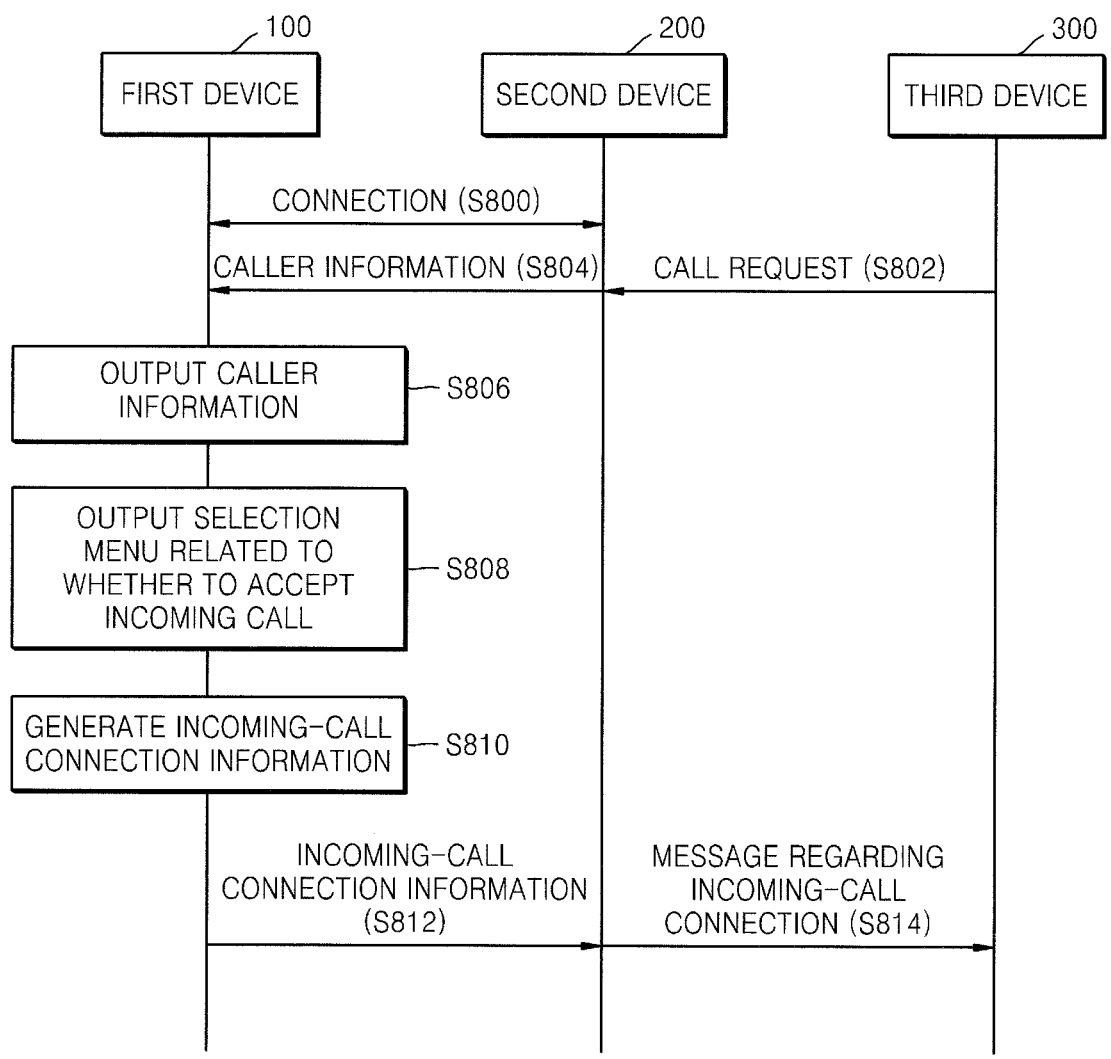
FIG. 8 is a flowchart of a method of receiving and processing caller information of a third device performed by the first device, according to an exemplary embodiment of the present invention.

FIG. 8 is a flowchart of a method of receiving and processing caller information of the third device 300, according to an exemplary embodiment of the present invention.

In operation S800, the first device 100 and the second device 200 may be connected to each other based on a user input via a widget window of the first device 100. For example, when a user selects a tethering button of the widget window, the first device 100 may request connection to the second device 200. In other examples, the second device 200 may request connection to the first device 100.

In operation S802, the third device 300 requests call-connection to the first device 100 via the second device 200. The second device 200 may receive a call signal from the third device 300 including the caller information at operation S802.

In operation S804, the second device 200 may provide the first device 100 with the caller information of the third device 300. For example, the second device 200 may receive a phone number from the third device 300, may extract a user name, a group name, and the like with respect to the received phone number from an address book and transmit the caller information, including information from the address book to, the first device 100 with the caller information of the third device 300.

In operation S806, the first device 100 may display the received caller information on a separate window on a screen of the first device 100.

In operation S808, the first device 100 may display a selection menu in the display associated with the caller information. The selection menu may include items incoming-call connection information such as 'accept incoming call', 'reject incoming call', and 'reject with message.'

In operation S810, the first device 100 generates incoming-call connection information according to the incoming-call connection information. The incoming-call connection information may include a command to accept the incoming call, a command to reject the incoming call, and a message regarding incoming-call connection. The first device 100 generates a command to accept the incoming call from the third device 300 based on the selected incoming-call connection information. For example, when a user selects 'accept incoming call' in the selection menu, the first device 100 generates a command to accept a call-connection with the third device 300. When the user selects 'reject incoming call' in the selection menu, the first device 100 may generate a command to reject the call-connection with the third device 300.

When the user selects 'reject with message' in the selection menu, the first device 100 may display a message input window on the screen and generate a message regarding whether or not to accept the incoming call. For example, the first device 100 may generate a message saying "I'm in a meeting so I can't receive your call," based on the user input to the message input window. The message input window may be separately displayed in the pop-up window that displays the caller information.

In operation S812, the first device 100 may provide the second device 200 with the command to accept the incoming call, the command to reject the incoming call, and/or the message regarding incoming-call connection. When the first device 100 provides the second device 200 with the command to accept the incoming call, the second device 200 may be connected to the third device 300 and may perform the call-connection.

In operation S814, the second device 200 provides the message regarding incoming-call connection to the third device 300. When the first device 100 provides the command to reject the incoming call to the second device 200, the second device 200 may block the call-connection with the third device 300. Also, the second device 200 may provide the third device 300 with a message received from the first device 100.

Hereinafter, a method of receiving a captured screen from the second device 200 will be described with reference to FIG. 9.

Figure 9:
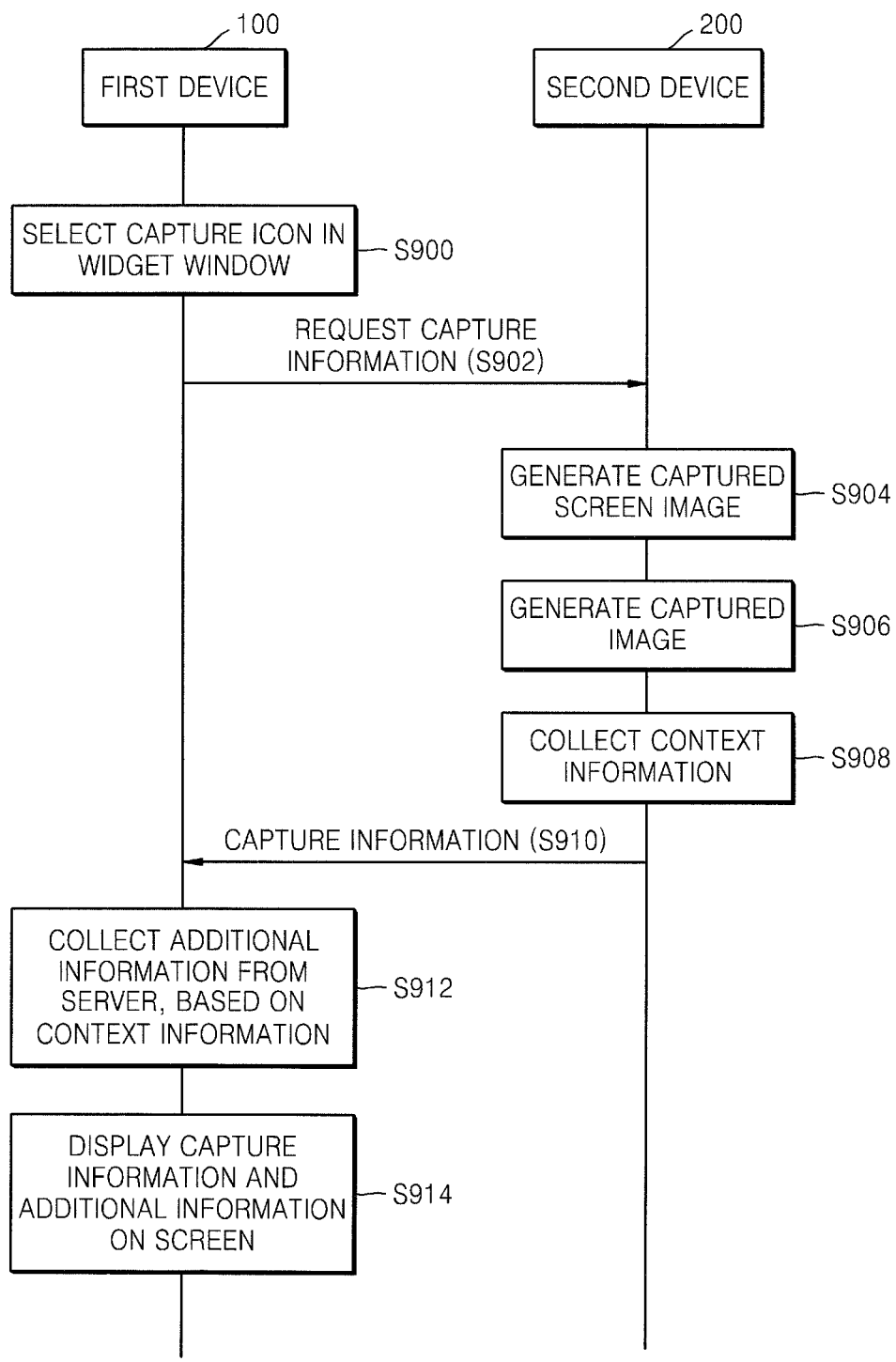
FIG. 9 is a flowchart of a method of receiving a captured screen from the second device, performed by the first device, according to an exemplary embodiment of the present invention.

FIG. 9 is a flowchart of a method of receiving a captured screen from the second device 200, according to an exemplary embodiment of the present invention.

In operation S900, in response to a user input, the first device 100 selects a capture icon in a widget window. The capture icon may include an icon to capture a screen of the second device 200 and an icon to take a picture by using the second device 200. One capture icon may be in the widget window and, when the capture icon is selected, a selection window for selection of capture types may be displayed. In this case, a user may select one of the capture types in the selection window and decide whether to capture the screen of the second device 200 or to take a picture by using the second device 200.

In operation S902, the first device 100 may request capture information. For example, the capture information may include a captured screen image of the second device 200 or an image captured by the second device 200.

In operation S904, in response to the request for the capture information, the second device 200 generates the captured screen image. When the first device 100 requests the capture information, the second device 200 may generate the captured screen image of the second device 200 in operation S904.

In operation S906, the second device 200 generates the captured image, in response to the request for the capture information. In operation S902, when the first device 100 requests the capture information including the image captured by the second device 200, in operation S906, the second device 200 may generate the captured image by using a photographing apparatus included in the second device 200.

In operation S908, the second device 200 generates context information related to at least one of a screen capturing operation and an image photographing operation. The context information may include a time, a place, and weather, for example.

In operation S910, the second device 200 provides the capture information to the first device 100. The capture information may include the captured screen image, the captured image, and the context information.

In operation S912, the first device 100 collects additional information from a server (not shown) based on the context information. In operation S912, the first device 100 may check the context information included in the capture information and then may collect the additional information corresponding to the context information. For example, the additional information may include map information, area information, and news information, for example.

In operation S914, the first device 100 displays the received capture information and the additional information on the screen. The first device 100 may display at least one of the captured screen image and the captured image, and may also display the context information and the additional information which are related to the captured screen image and/or the captured image.

Hereinafter, a method of performing communication between devices will be described with reference to FIG. 10.

Figures 10, 11:
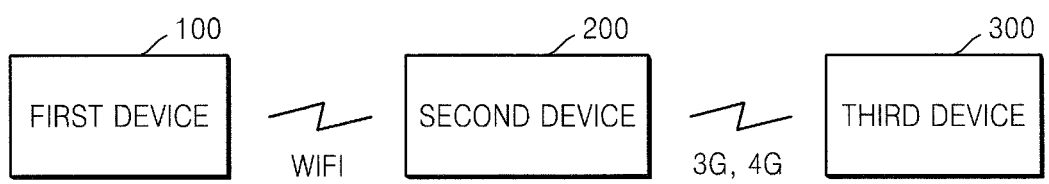
FIG. 10 is a diagram illustrating a method of performing communication between devices according to an exemplary embodiment of the present invention.
FIG. 11 illustrates an example of an address book according to an exemplary embodiment of the present invention.

FIG. 10 is a diagram illustrating a method of performing communication between devices, according to an exemplary embodiment of the present invention.

Referring to FIG. 10, the first device 100 may use a wireless communication function of the second device 200 via tethering. For example, the first device 100 may be connected with the second device 200 via Wireless Fidelity (Wi-Fi) communication. Also, the first device 100 and the second device 200 may be connected to each other by using a different wireless communication service such as a Third Generation (3G) mobile communication or the Fourth Generation (4G) mobile communication.

In this case, a tethering function of the second device 200 may be activated in response to a user input in a widget window in the first device 100. For example, when a predetermined region is selected in the widget window displayed in the first device 100, the first device 100 may request the second device 200 for activation of the tethering function. That is, when the widget window is active in the first device 100, the first device 100 may request the second device 200 for the tethering function.

Also, the first device 100 and the second device 200 may exchange access information for communication when the tethering function is requested.

For example, a widget window application to perform device detection and data transmission using a widget window may be executed in the first device 100. In this example, the first device 100 and the second device 200 may be connected to each other by using the widget window application. Also, a widget window agent in the widget window application that may be executed when a power of the first device 100 is ON and may execute the widget window in the first device 100 when a peripheral device for connection exists at a same Access Point (AP) as that of the first device 100. The widget window application may detect the second device 200 and connect the first device 100 and the detected second device 200. In more detail, the widget window application may detect the second device 200 that is a peripheral device of the first device 100 and transmit an authentication code to the detected second device 200. The second device 200 may confirm the authentication code and perform Wi-Fi communication configuration for connection to the first device 100. Also, the second device 200 may provide the first device 100 with an Internet Protocol (IP) value and a verified authentication code. The widget window application may authenticate the detected second device 200 to connect the first device 100 and the second device 200. After the authentication is performed between the first device 100 and the second device 200, the first device 100 and the second device 200 may be connected to each other without separate authentication.

In another example, the first device 100 and the second device 200 may be connected to each other by using a Universal Serial Bus (USB) cable. In this example, the widget window application of the first device 100 may execute the widget window on a screen of the first device 100 and request the second device 200 to execute a widget window application of the second device 200. Also, when the USB connection between the first device 100 and the second device 200 is disconnected, the first device 100 and the second device 200 may be re-connected to each other via Wi-Fi communication.

Hereinafter, an address book will be described with reference to FIG. 11.

FIG. 11 illustrates an example of an address book according to an exemplary embodiment of the present invention.

Referring to FIG. 11, the address book includes a speed-dial field 90, a user field 91, a phone number field 92, a group field 93, a device field 94, and an application field 95.

Speed-dials corresponding to phone numbers are recorded in the speed-dial field 90 and user names corresponding to the phone numbers are recorded in the user field 91. The phone numbers are recorded in the phone number field 92 and group names of the user are recorded in the group field 93. In the address book, types of devices corresponding to the phone numbers are recorded in the device field 94. For example, device names such as 'Galaxy S3' and 'I-Phone' may be recorded in the device field 94. Names of applications that are installed in the devices are recorded in the application field 95. For example, names of messenger applications such as Twitter® and Facebook® may be recorded in the application field 95. The address book may be directly provided from the second device 200 to the first device 100 or may be indirectly provided from the second device 200 to the first device 100 via a separate server (not shown), and the first device 100 may detect a device to receive data using the address book.

Also, prefixes may match with names of the devices recorded in the device field 94 and the names of applications recorded in the application field 95, respectively. Thus, when a user inputs a keyword for device detection, the user may also input a predetermined prefix to filter some of the devices by using the input prefix and perform detection with respect to the filtered devices.

Hereinafter, an example of device detection for data transmission by the first device 100 will be described with reference to FIG. 12.

Figure 12:
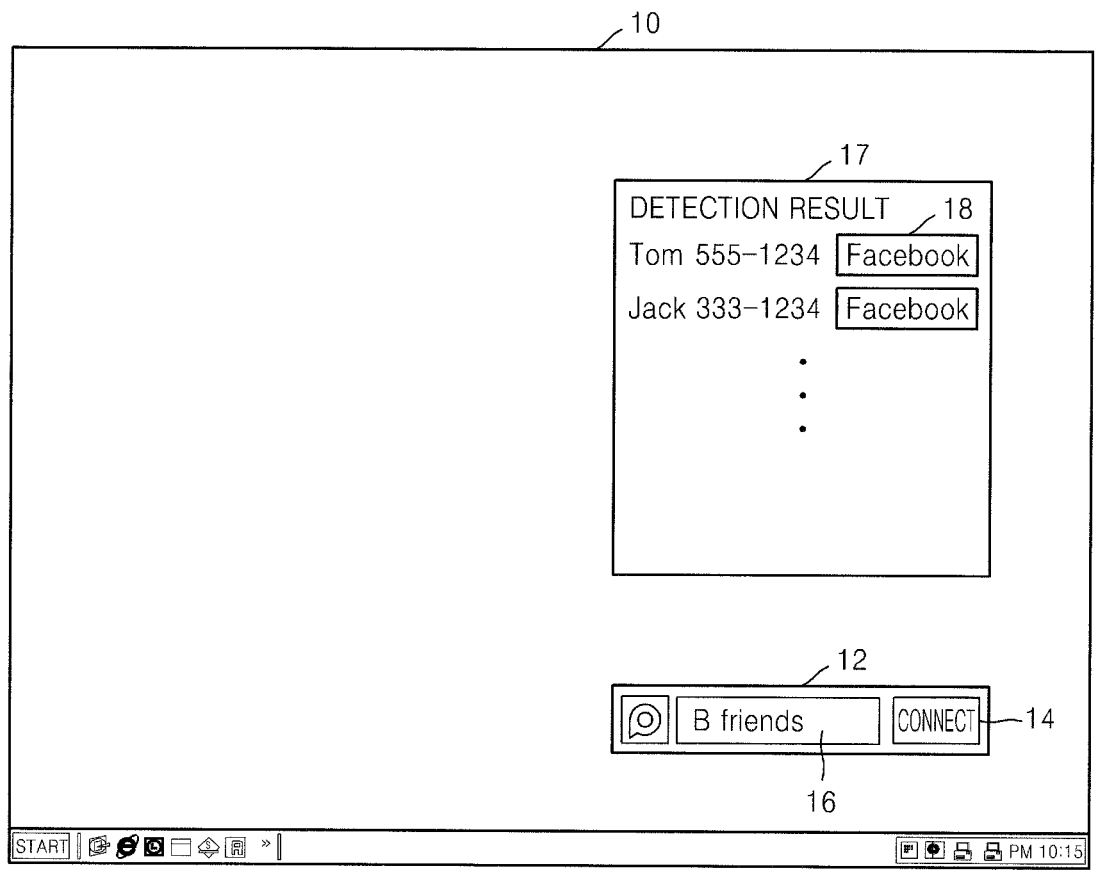
FIG. 12 illustrates an example of device detection for data transmission by the first device according to an exemplary embodiment of the present invention.

FIG. 12 illustrates an example of device detection for data transmission by the first device 100, according to an exemplary embodiment of the present invention.

Referring to FIG. 12, a widget window 12 for data transmission may be displayed on a screen 10 of the first device 100. When a predetermined button 14 is selected in the widget window 12, the first device 100 and the second device 200 may be connected to each other. In another example, when the widget window 12 is active in the first device 100, the first device 100 and the second device 200 may be connected to each other.

Also, a user may input a keyword into a detection field 16 of the widget window 12 to detect a target to receive data. For example, when the user inputs 'B friends' into the detection field 16, the first device 100 may filter devices from an address book by using a prefix 'B' and detect a device that belongs to a friend of the user from among the filtered devices The detection result may be output to a separate window 17 and applications that are installed in the user's device may be displayed on a region 18 of the output result. When the region 18 is selected, a corresponding application may be executed in the second device 200 to transmit data to the detected device via the second device 200. In this example, the first device 100 may provide the second device 200 with a control command to execute the application and the data to be transmitted.

Hereinafter, an example of a widget window for displaying a result of device detection will be described with reference to FIG. 13.

Figure 13:
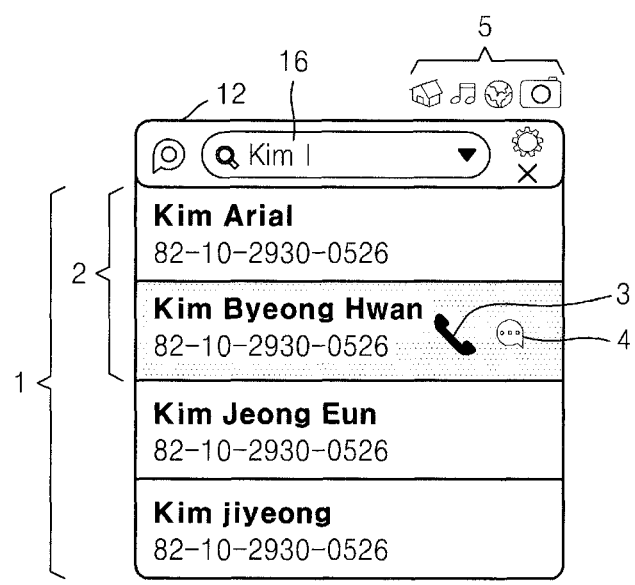
FIG. 13 illustrates an example of a widget window for displaying a result of device detection according to an exemplary embodiment of the present invention.

FIG. 13 illustrates an example of a widget window for displaying a result of device detection, according to an exemplary embodiment of the present invention.

Referring to FIG. 13, when a keyword 'Kim' is input to a detection field 16 of a widget window 12, a device detection list 1 corresponding to the keyword 'Kim' is displayed below the widget window 12. As illustrated in FIG. 13, the device detection list 1 may include user names and phone numbers of detected devices. The device detection list 1 may also include a recent device detection list 2 of devices that are recently used by a user that is distinguishably displayed on an upper portion of the device detection list 1.

The device detection list 1 may include a calling icon 3 and a message transmission icon 4. When the user selects the calling icon 3, the first device 100 may request the second device 200 to make a call to a device displayed on the detection list 1. When the user selects the message transmission icon 4, a message transmission window (not shown) is displayed on a screen of the first device 100 and the first device 100 may transmit a message, which is input to the message transmission window, to the third device 300 via the second device 200.

In addition, a plurality of icons 5 is displayed on the widget window 12 to allow functions to be performed in the first device 100. For example, the icons 5 may include an icon for movement to a home-screen, an icon for reproduction of music, an icon for execution of an internet browser, and an icon for a request for a captured image. When the user selects the icon for a request for a captured image, the first device 100 may request the second device 200 for a captured screen image of the second device 200. Also, when the user selects the icon for a request for a captured image, the first device 100 may request the second device 200 for an image captured by the second device 200.

Hereinafter, an example of file transmission based on a file transmission method that is selected by the first device 100 via a widget window will be described with reference to FIG. 14.

Figure 14:
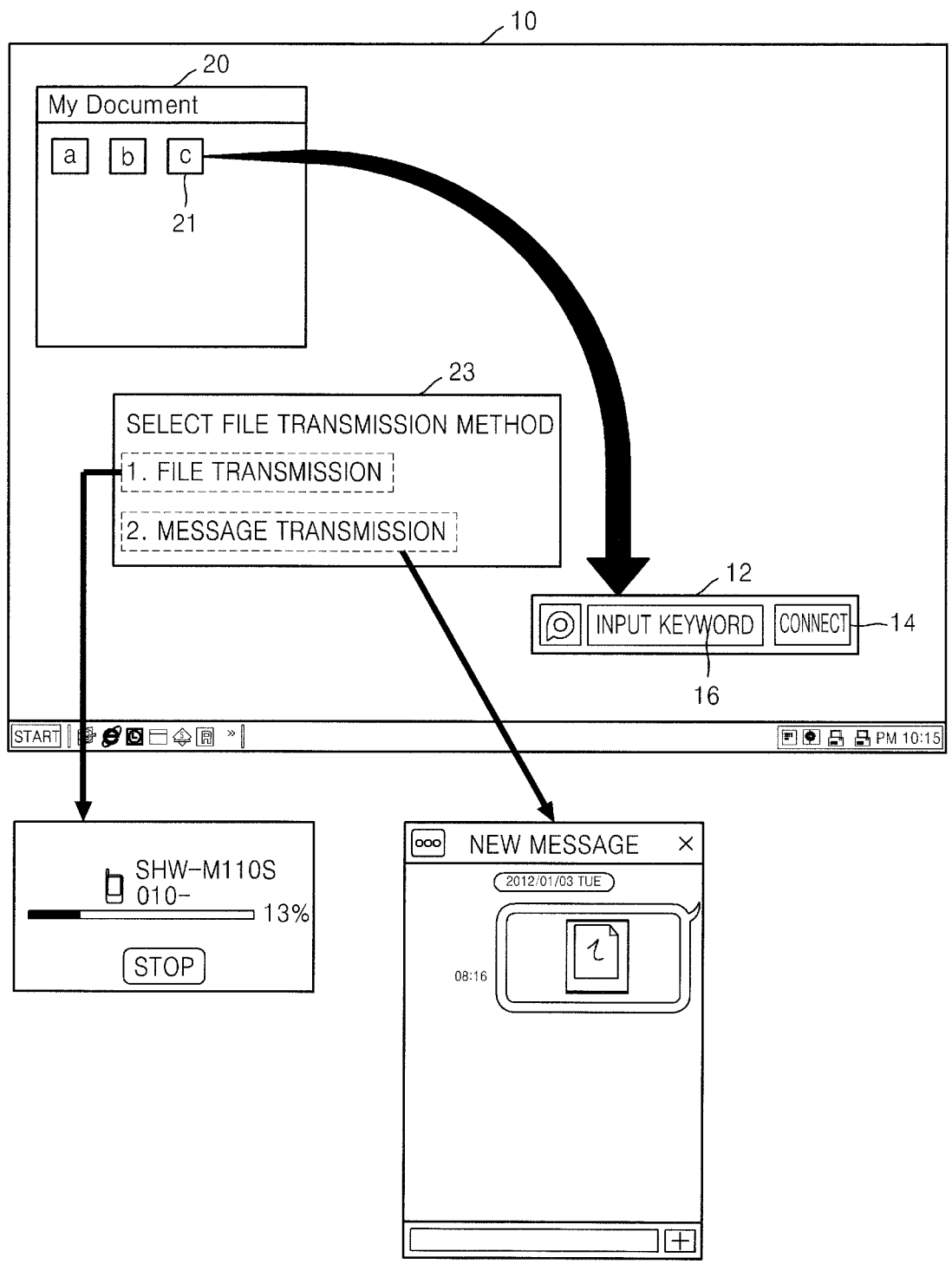
FIG. 14 illustrates an example of file transmission based on a file transmission method that is selected by the first device via a widget window according to an exemplary embodiment of the present invention.

FIG. 14 illustrates an example of file transmission based on a file transmission method that is selected by the first device 100 via a widget window, according to an exemplary embodiment of the present invention.

Referring to FIG. 14, when a user selects a file 21 from a folder 20 that is displayed on a screen 10 of the first device 100 and moves the selected file 21 to a widget window 12, a selection window 23 may be displayed on the screen 10 for selection of a file transmission method. The selection window 23 may include a list containing 'file transmission' for direct file transmission and 'message transmission' for file transmission via a message.

When 'file transmission' is selected from the selection list, the first device 100 may provide a selected file to the second device 200 without a separate procedure. When 'message transmission' is selected from the selection list, a guide message related to a keyword input may be displayed in a detection field 16 of the widget window 12. In response, the user may input a keyword to the detection field 16 to detect a device, and the second device 200 may generate a message transmission window 24 with respect to the detected device and insert the selected file into the message transmission window 24. The first device 100 may provide the file inserted into the message transmission window 24 to the detected device via the second device 200.

Hereinafter, an example of file transmission to a file transmission target selected by the first device 100 will be described with reference to FIG. 15.

Figure 15:
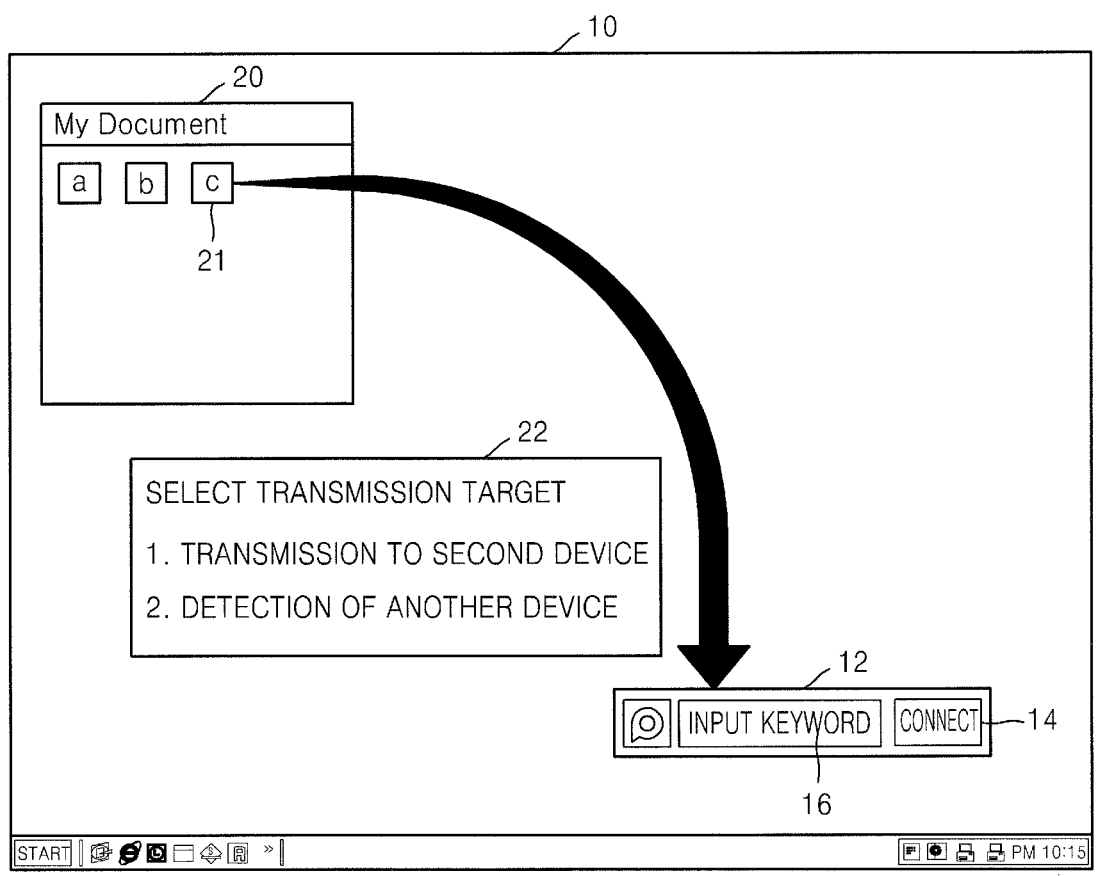
FIG. 15 illustrates an example of file transmission to a transmission target selected by the first device according to an exemplary embodiment of the present invention.

FIG. 15 illustrates an example of file transmission to a file transmission target selected by the first device 100, according to an exemplary embodiment of the present invention.

Referring to FIG. 15, when a user selects a file 21 from a folder 20 displayed on a screen 10 of the first device 100 and moves the file 21 to a widget window 12, a selection window 22 is displayed for selection of a transmission target.

For example, the selection window 22 may include a selection list such as 'transmission to second device' and 'detection of another device'. When the second device 200 is selected from the selection list, the first device 100 may provide the selected file 21 to the second device 200 without a separate procedure. When the third device 300 is selected from the selection list (i.e., when 'detection of another device' is selected), a guide message related to a keyword input may be displayed in a detection field 16 of the widget window 12. Then, the user may input a keyword to the detection field 16 to detect a device and provide the selected file 21 to the detected device via the second device 200.

Figure 16:
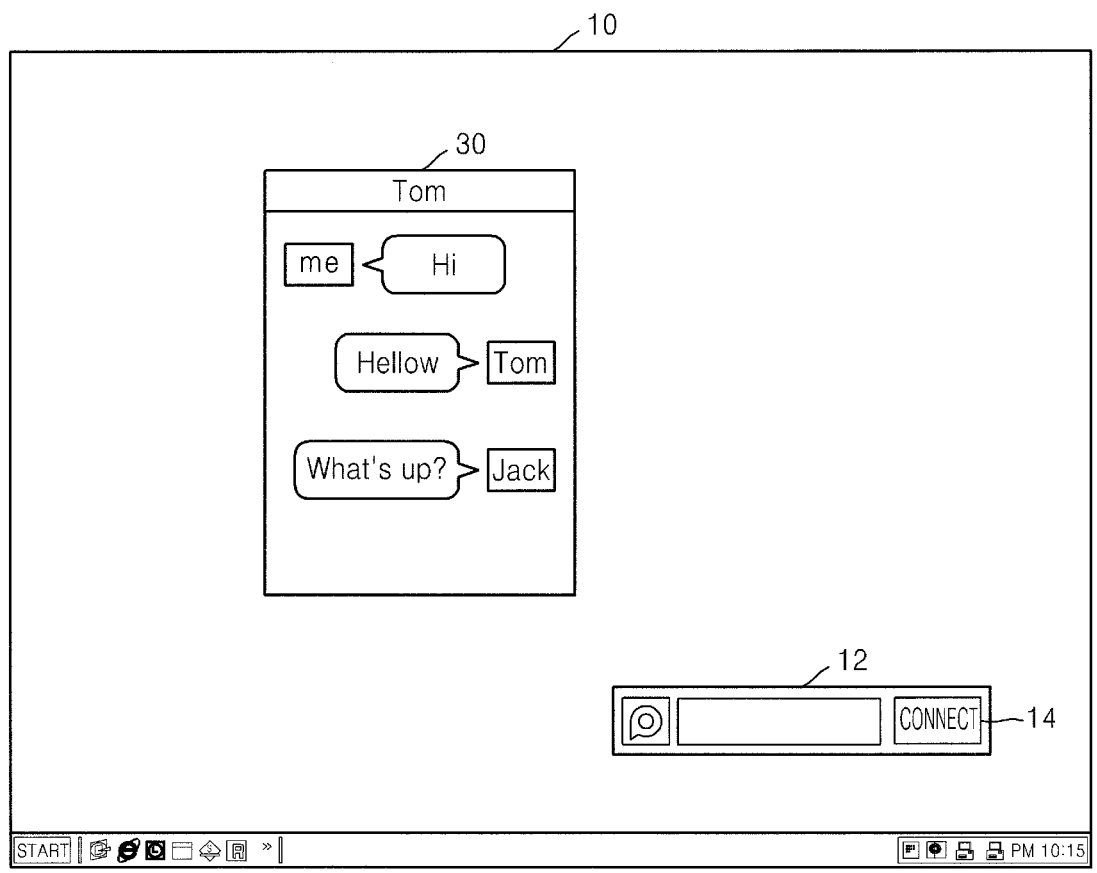
FIG. 16 illustrates an example of message transmission by the first device according to an exemplary embodiment of the present invention.

FIG. 16 illustrates an example of message transmission by the first device 100, according to an exemplary embodiment of the present invention.

Referring to FIG. 16, when the second device 200 receives a message from the third device 300, the second device 200 may provide the received message to the first device 100, which displays the received message on a message window 30. A user may input a message to the message window 30 and the input message may be provided to the third device 300 via the second device 200. Also, the user may detect another device by using a widget window 12 to provide a message to the other detected device via the message window 30.

Figure 17:
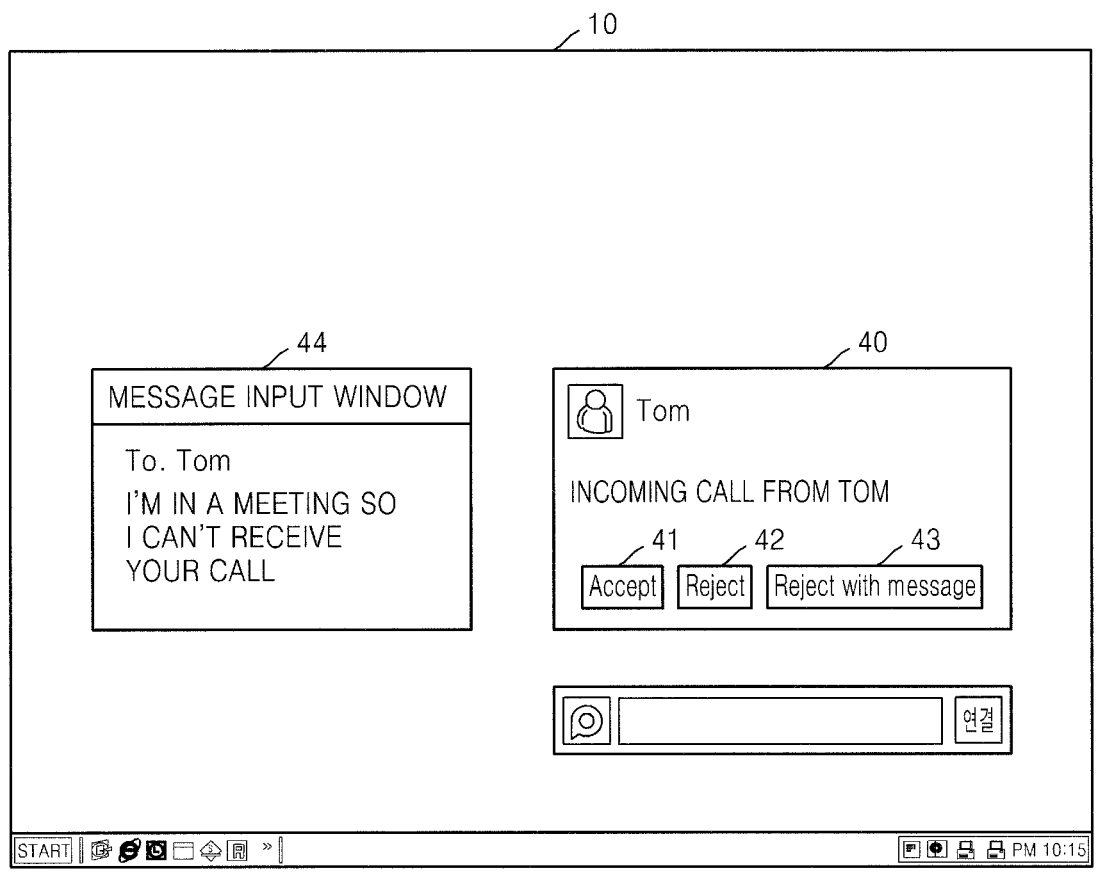
FIG. 17 illustrates an example in which caller information of the third device is displayed on the first device, and incoming-call connection information regarding whether or not to accept an incoming call from the third device is generated according to an exemplary embodiment of the present invention.

FIG. 17 illustrates an example in which caller information of the third device 300 is displayed on the first device 100 and incoming-call connection information related to acceptance of an incoming call from the third device 300 is generated according to an exemplary embodiment of the present invention.

Referring to FIG. 17, when the third device 300 attempts to make a phone call to the second device 200, the second device 200 may provide the caller information of the third device 300 to the first device 100. In this example, the first device 100 may receive the caller information and may display the caller information on a call reception notice window 40. Afterward, a user may select an 'accept' button 41, a 'reject' button 42, or a 'reject with message' button 43 to accept or reject an incoming call. In response, the first device 100 may generate the incoming-call connection information based on the selection. For example, when the user selects the 'accept' button 41, the first device 100 may generate a command to accept the incoming call and provide the command to the second device 200.

When the user selects the 'reject' button 42, the first device 100 may generate a command to reject the incoming call and then may provide the command to the second device 200.

In another example, when the user selects the 'reject with message' button 43, the first device 100 may generate a command to reject the incoming call, provide the command to the second device 200, and generate and display a separate message input window 44 related to acceptance or rejection of the call. For example, the user may input a message saying "I'm in a meeting so I can't receive your call" to the message input window 44 and then the first device 100 may provide the input message to the third device 300 via the second device 200.

Figure 18:
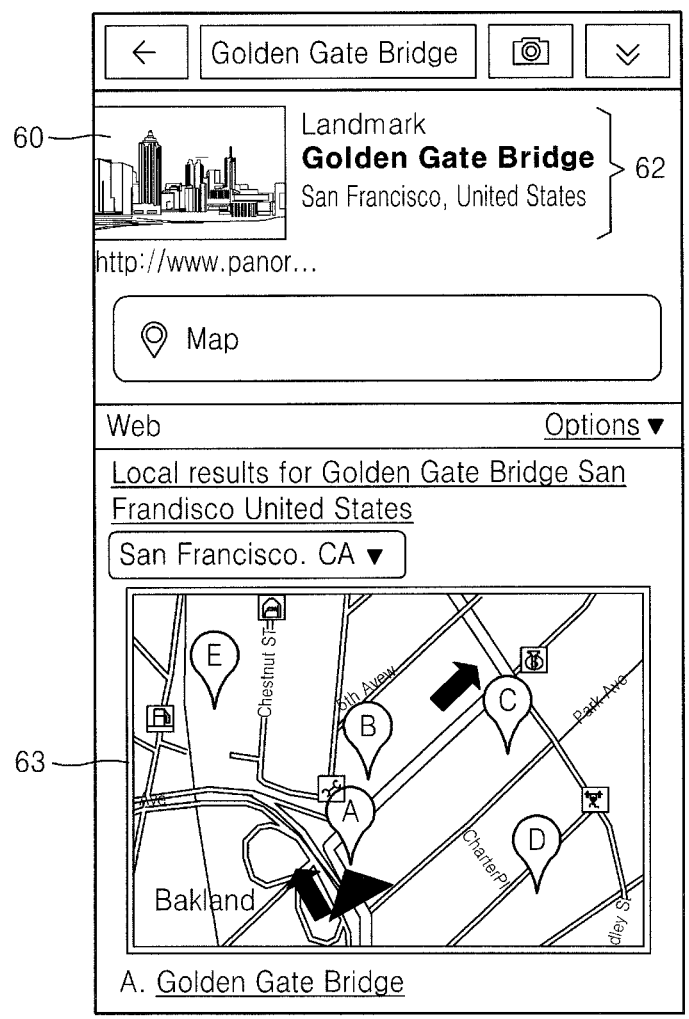
FIG. 18 illustrates an example in which capture information and additional information are displayed on the first device according to an exemplary embodiment of the present invention.

FIG. 18 illustrates an example in which capture information and additional information are displayed on the first device 100 according to an exemplary embodiment of the present invention.

When the first device 100 requests a captured image from the second device 200, the second device 200 may provide the first device 100 with capture information including the captured image. The first device 100 may collect additional information from a server (not shown) by using context information included in the capture information.

The capture information and the additional information are illustrated in the example of FIG. 18. An image 60 captured by the second device 200, location information 62 about where the image 60 was captured, and map information 63 illustrating the location may be displayed on a screen of the first device 100.

Figure 19:
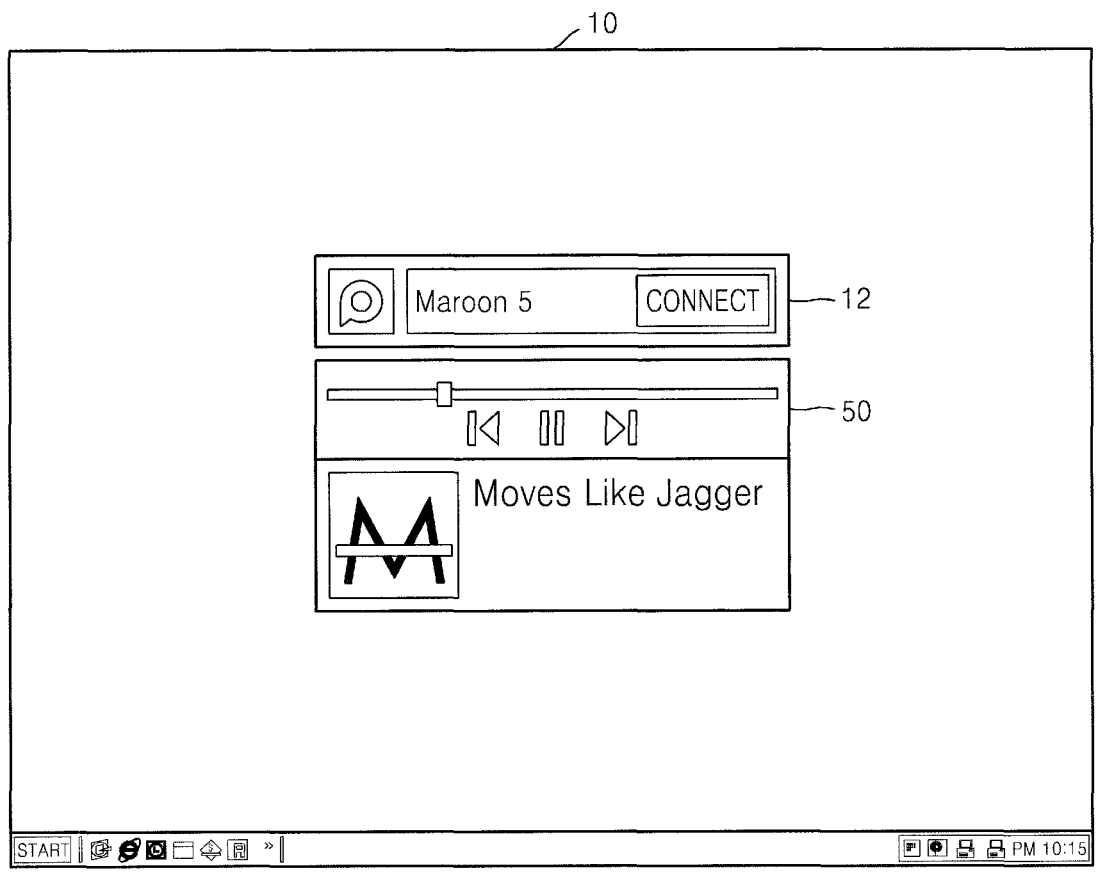
FIG. 19 illustrates an example in which the first device receives and outputs content that is being executed in the second device according to an exemplary embodiment of the present invention.

FIG. 19 illustrates an example in which the first device 100 receives and outputs content that is being executed in the second device 200, according to an exemplary embodiment of the present invention.

Referring to FIG. 19, when the user selects a predetermined button in a widget window 12 displayed on the first device 100, content that is being executed in the second device 200 may be provided to the first device 100. The second device 200 may stream the content to the first device 100 in real-time, which may execute an application 50 to reproduce the streamed content according to a type of the streamed content.

According to the one or more exemplary embodiments of the present invention, a transmission target may be effectively selected by using a widget window and data may be transmitted to the file transmission target.

Also, according to the one or more exemplary embodiments of the present invention, a transmission target may be detected from an address book stored in another device and, using the widget window, data may be transmitted to the detected transmission target via the other device.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of transmitting, by a computer, a file by using an execution window of an application that connects the computer to a first mobile terminal, the method comprising:
   receiving an address book stored in the first mobile terminal from the first mobile terminal;
   moving a file selected on a screen of the computer to the execution window of the application;
   when the file is moved to the execution window, receiving a keyword that is input to the execution window;
   detecting at least one second mobile terminal corresponding to the keyword from the received address book; and
   transmitting the file from the computer to the at least one second mobile terminal via the first mobile terminal,
   wherein the keyword comprises a textual prefix tag value, and detection targets of the keyword differ from each other according to the textual prefix tag value, the textual prefix tag value corresponding to at least one of a plurality of types of data transmission services supported by the at least one second mobile terminal.

2. The method of claim 1, wherein the transmitting of the file comprises transmitting the file to the first mobile terminal that is connected with the computer.

3. The method of claim 1, wherein a communication method between the computer and the first mobile terminal is different from a communication method between the at least one second mobile terminal and the first mobile terminal.

4. The method of claim 3, wherein the computer and the first mobile terminal are connected to each other via Wireless Fidelity (Wi-Fi™) communication, and the at least one second mobile terminal and the first mobile terminal are connected via cellular mobile communication.

5. The method of claim 1, wherein the transmitting of the file from the computer to the at least one second mobile terminal via the first mobile terminal comprises:
  generating a message input window;
  inserting the file into the message input window; and
  providing the file to the first mobile terminal.

6. The method of claim 1, wherein the moving comprises moving the file to the execution window in a drag and drop manner.

7. A method of transmitting, by a first mobile terminal connected with a computer, a file received from the computer to at least one second mobile terminal, the method comprising:
  transmitting an address book stored in the first mobile terminal to the computer;
  receiving, by the first mobile terminal, the file from the computer, in response to the file being selected on a screen of the computer and moved to an execution window of an application that connects the computer and the first mobile terminal;
  receiving a keyword that is input to the execution window from the computer;
  detecting the at least one second mobile terminal corresponding to the keyword from the address book;
  transmitting from the computer, by the first mobile terminal, the file to the at least one second mobile terminal that is connectable with the first mobile terminal; and
  transmitting information stored in the first mobile terminal to the computer to detect the at least one second mobile terminal,
  wherein the keyword comprises a textual prefix tag value, and detection targets of the keyword differ from each other according to the textual prefix tag value, the textual prefix tag value corresponding to at least one of a plurality of types of data transmission services supported by the at least one second mobile terminal.

8. The method of claim 7, wherein a communication method between the computer and the first mobile terminal is different from a communication method between the first mobile terminal and the at least one second mobile terminal.

9. The method of claim 8, wherein the computer and the first mobile terminal are connected to each other via Wireless Fidelity (Wi-Fi™) communication, and the first mobile terminal and the at least one second mobile terminal are connected to each other via cellular mobile communication.

10. The method of claim 7,
  wherein the receiving of the file comprises receiving the file from the computer via a message, and
  wherein the file is inserted into a message input window that is generated by the computer when the at least one second mobile terminal is selected from the address book.

11. A computer for transmitting a file by using an execution window of an application, the computer comprising:
  one or more processors;
  at least one memory; and
  one or more programs,
  wherein the one or more programs are stored in the at least one memory and configured to be executed by the one or more processors, the one or more programs including instructions to:
    receive a keyword that is input to the execution window,
    receive an address book stored in a first mobile terminal to detect a second mobile terminal connectable with the first mobile terminal from the first mobile terminal,
    detect at least one second mobile terminal corresponding to the keyword from the received address book, and
    transmit the file from the computer to the at least one second mobile terminal via the first mobile terminal, and
  wherein the keyword comprises a textual prefix tag value, and detection targets of the keyword differ from each other according to the textual prefix tag value, the textual prefix tag value corresponding to at least one of a plurality of types of data transmission services supported by the at least one second mobile terminal.

12. The computer of claim 11, wherein the file is transmitted to the first mobile terminal.

13. The computer of claim 11, wherein a communication method between the computer and the first mobile terminal is different from a communication method between the at least one second mobile terminal and the first mobile terminal.

14. The computer of claim 13, wherein the computer and the first mobile terminal are connected to each other via Wireless Fidelity (Wi-Fi™) communication, and the at least one second mobile terminal and the first mobile terminal are connected to each other via cellular mobile communication.

15. The computer of claim 11,
  wherein the transmitting the file from the computer to the at least one second mobile terminal via the first mobile terminal comprises:
    generating a message input window,
    inserting the file into the message input window, and
    providing the file to the first mobile terminal.

16. The computer of claim 11, wherein the file is moved to the execution window in a drag and drop manner.

17. A first mobile terminal comprising:
  a touch sensitive display;
  one or more processors;
  at least one memory; and
  one or more programs,
  wherein the one or more programs are stored in the at least one memory and configured to be executed by the one or more processors, the one or more programs including instructions to:
    receive a file from a computer when the file is selected and moved to an execution window of an application that connects the computer and the first mobile terminal,
    transmit an address book stored in the first mobile terminal to the computer,
    receive a keyword that is input to the execution window from the computer,
    detect at least one second mobile terminal corresponding to the keyword from the address book, transmit the file to the at least one second mobile terminal that is connectable with the first mobile terminal, and transmit information stored in the first mobile terminal to the computer to detect the at least one second mobile terminal, and wherein the keyword comprises a textual prefix tag value, and detection targets of the keyword differ from each other according to the textual prefix tag value, the textual prefix tag value corresponding to at least one of a plurality of types of data transmission services supported by the at least one second mobile terminal.

18. The first mobile terminal of claim 17, wherein a communication method between the computer and the first mobile terminal is different from a communication method between the first mobile terminal and the at least one second mobile terminal.

19. The first mobile terminal of claim 18, wherein the computer and the first mobile terminal are connected to each other via Wireless Fidelity (Wi-Fi™) communication, and the first mobile terminal and the at least one second mobile terminal are connected to each other via cellular mobile communication.

20. The first mobile terminal of claim 17,
wherein the file is further received from the computer via a message, and
wherein the file is inserted into a message input window that is generated by the computer when the at least one second mobile terminal is selected from the address book.

21. The first mobile terminal of claim 17,
wherein the address book is transmitted from the first mobile terminal to the computer, and
wherein the address book is used to detect a target to receive the file in response to the keyword that is input to the execution window.

22. The first mobile terminal of claim 17, wherein a communication comprises at least one of a text message or call information associated with a call from a user of the at least one second mobile terminal.

23. A non-transitory computer-readable recording medium having a program recorded thereon, the program causing a computer to execute the method of claim 1.

24. A non-transitory computer-readable recording medium having a program recorded thereon, the program causing a computer to execute the method of claim 7.

* * * * *